Sept. 29, 1925.

E. J. VON PEIN

CASH REGISTER

Original Filed March 29, 1919      10 Sheets-Sheet 1

Inventor
EDWARD J. VON PEIN
Carl Beust
Henry E. Stauffer
Attorneys

Sept. 29, 1925.  E. J. VON PEIN  1,555,534
CASH REGISTER
Original Filed March 29, 1919   10 Sheets-Sheet 2

Inventor
EDWARD J. VON PEIN
Attorneys

Sept. 29, 1925. 1,555,534
E. J. VON PEIN
CASH REGISTER
Original Filed March 29, 1919 10 Sheets-Sheet 3
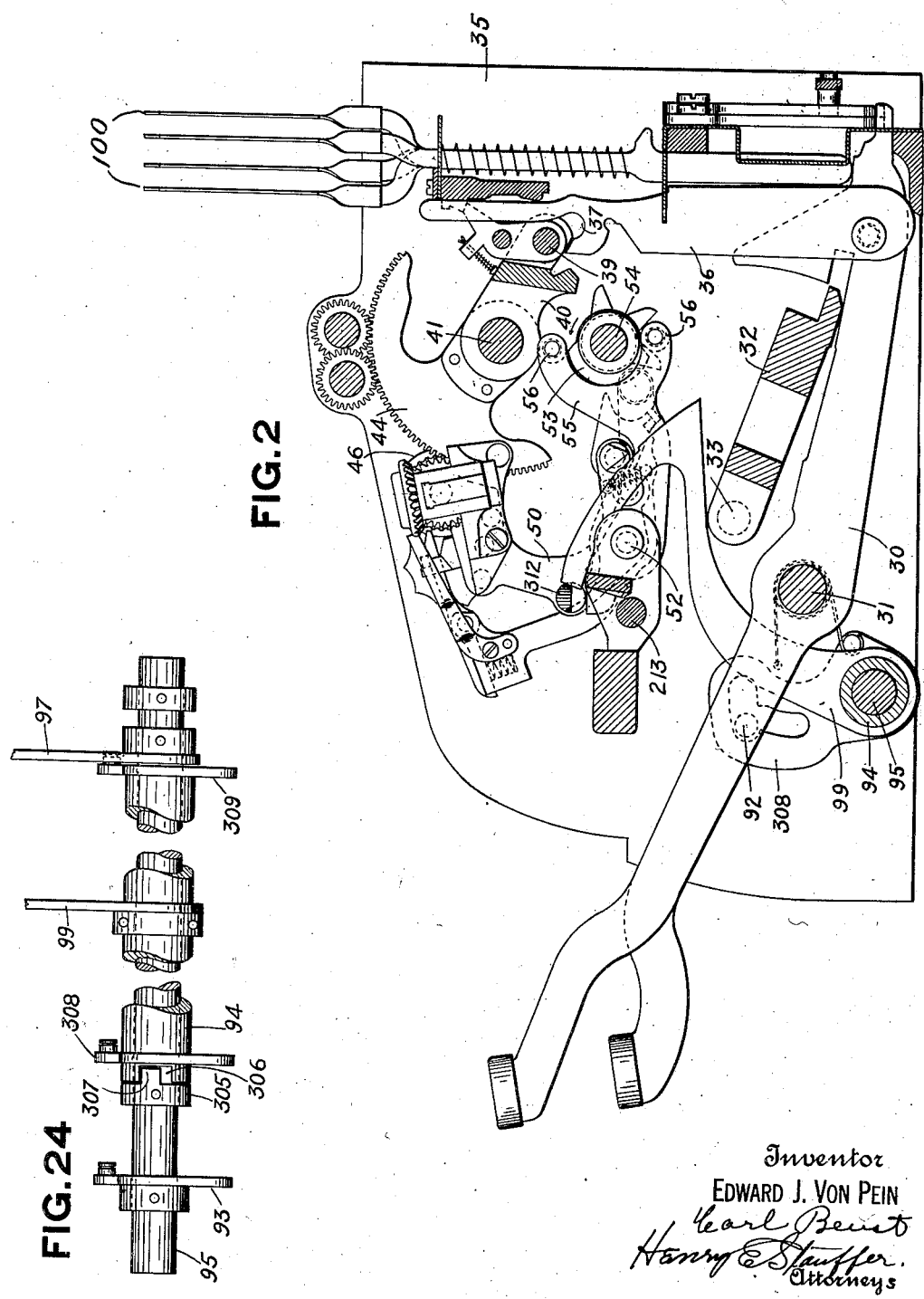
Inventor
EDWARD J. VON PEIN
Carl Beust
Henry E. Stauffer
Attorneys Sept. 29, 1925.
E. J. VON PEIN
1,555,534
CASH REGISTER
Original Filed March 29, 1919    10 Sheets-Sheet 4
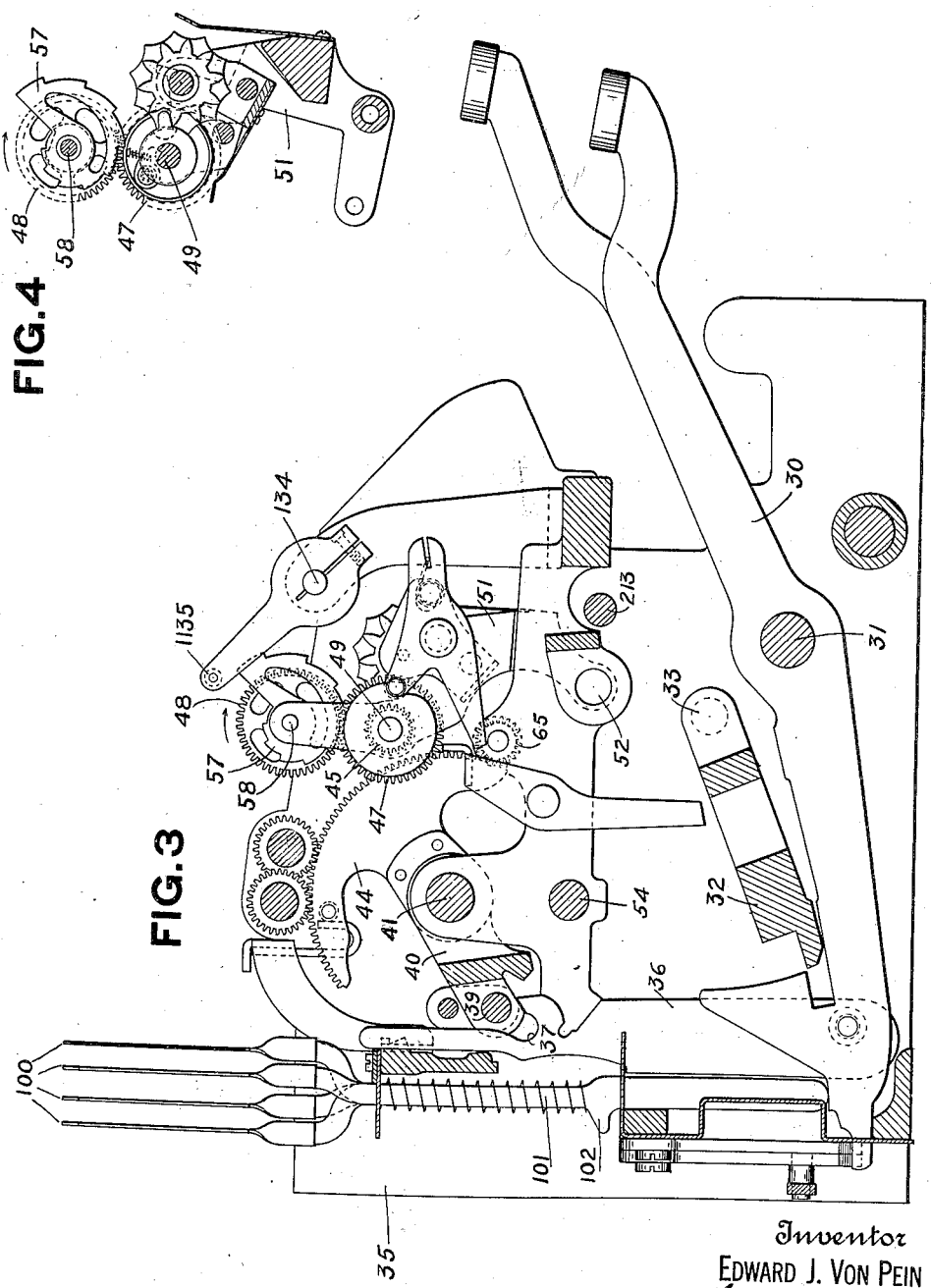
Inventor
EDWARD J. VON PEIN
Attorneys Sept. 29, 1925.
E. J. VON PEIN
1,555,534
CASH REGISTER
Original Filed March 29, 1919  10 Sheets-Sheet 5
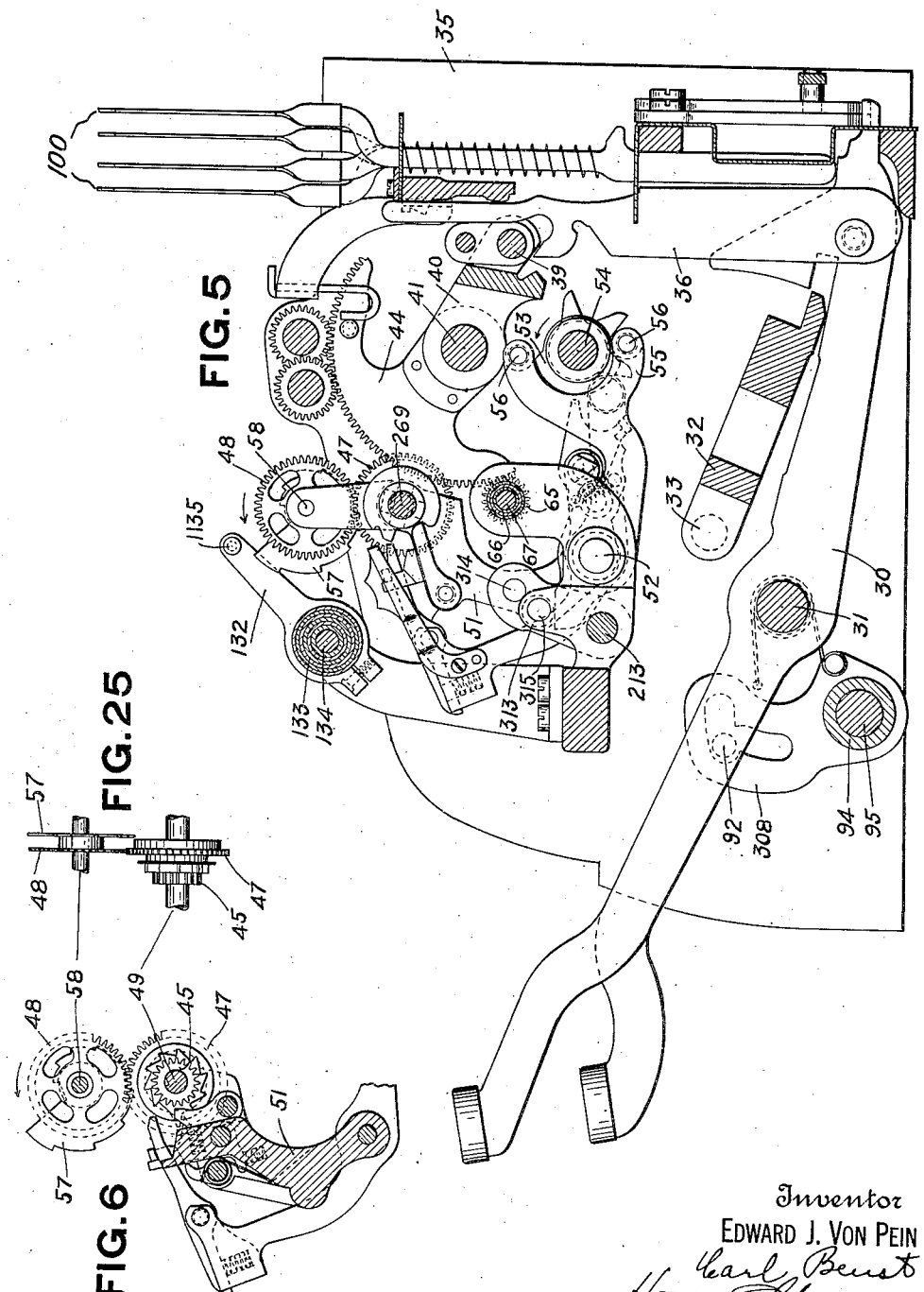
Inventor
EDWARD J. VON PEIN
Carl Beust
Henry E. Stauffer
Attorneys

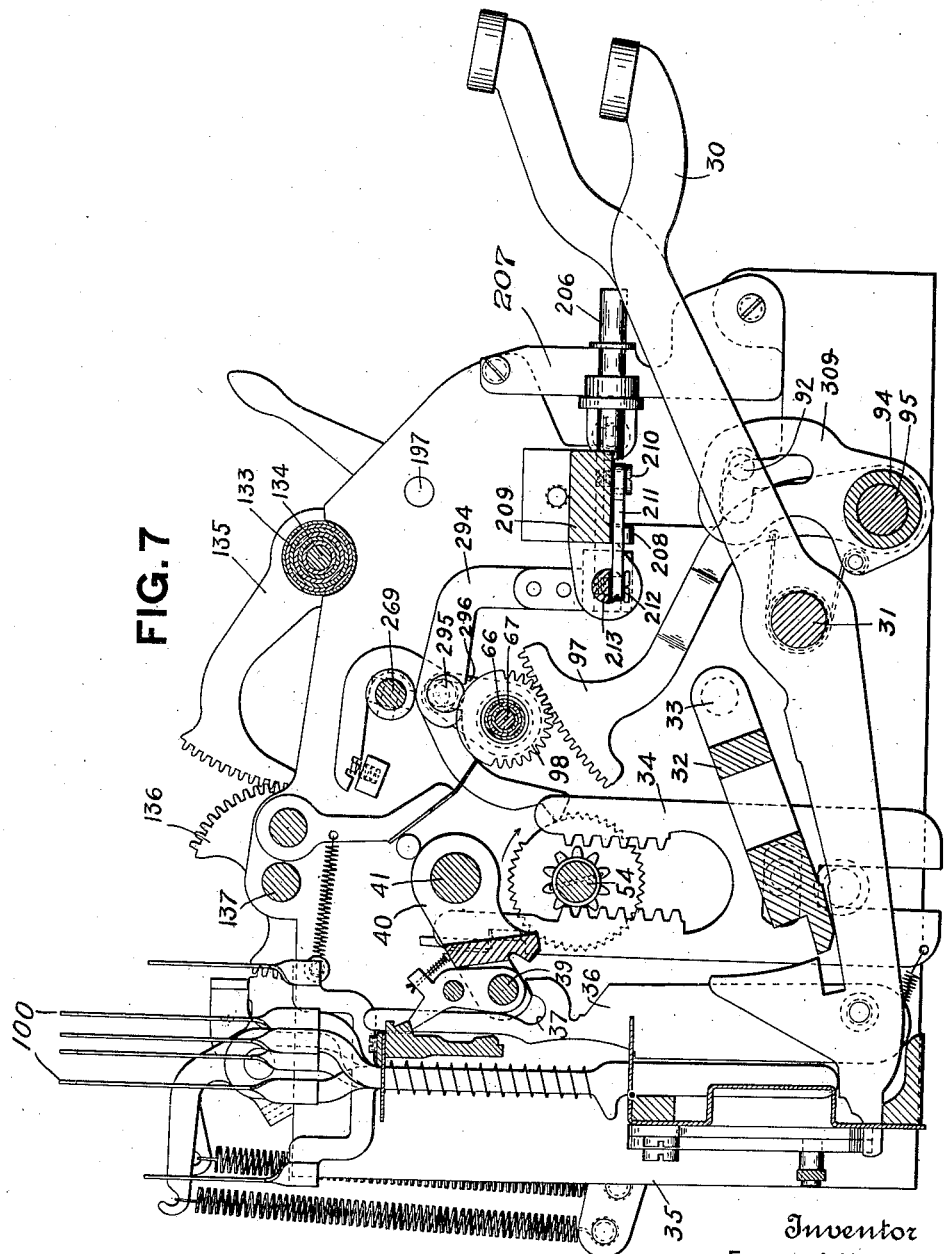

Sept. 29, 1925.
E. J. VON PEIN
CASH REGISTER
Original Filed March 29, 1919     10 Sheets-Sheet 7
1,555,534
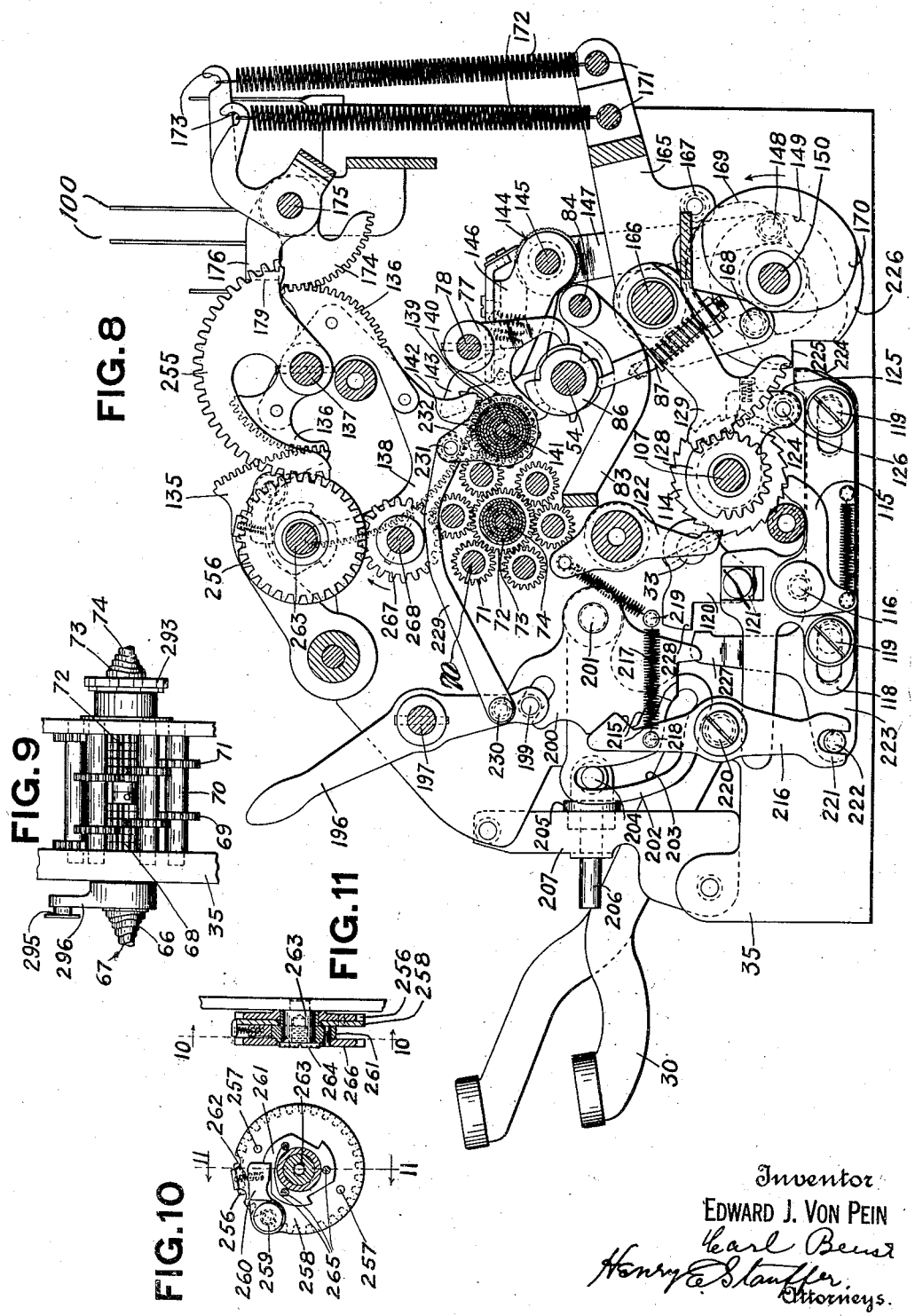
Inventor
EDWARD J. VON PEIN
Carl Beust
Henry E Stauffer.
Attorneys.

Sept. 29, 1925.
E. J. VON PEIN
1,555,534
CASH REGISTER
Original Filed March 29, 1919   10 Sheets-Sheet 8
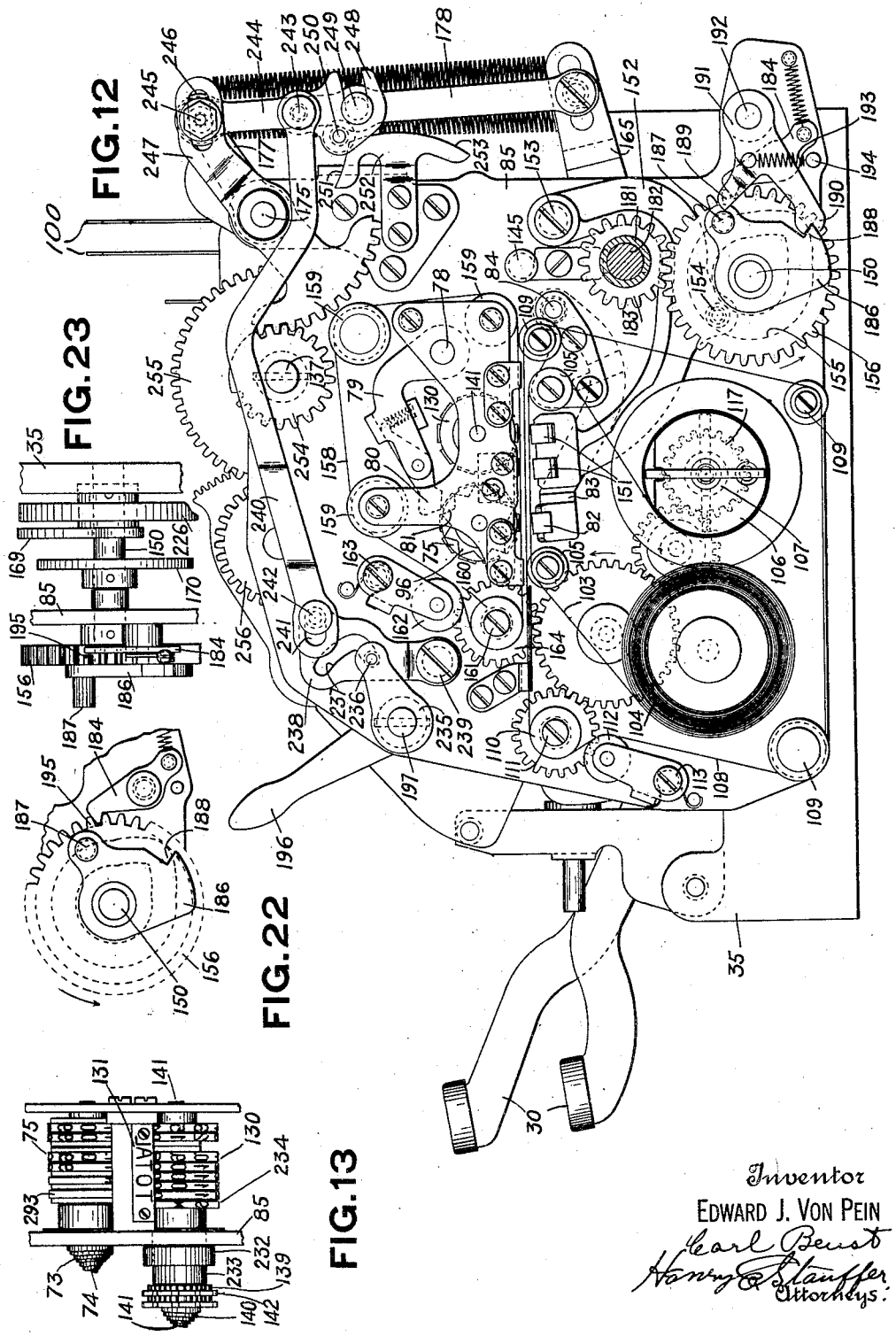
Inventor
EDWARD J. VON PEIN Sept. 29, 1925.
E. J. VON PEIN
CASH REGISTER
Original Filed March 29, 1919    10 Sheets-Sheet 9
1,555,534
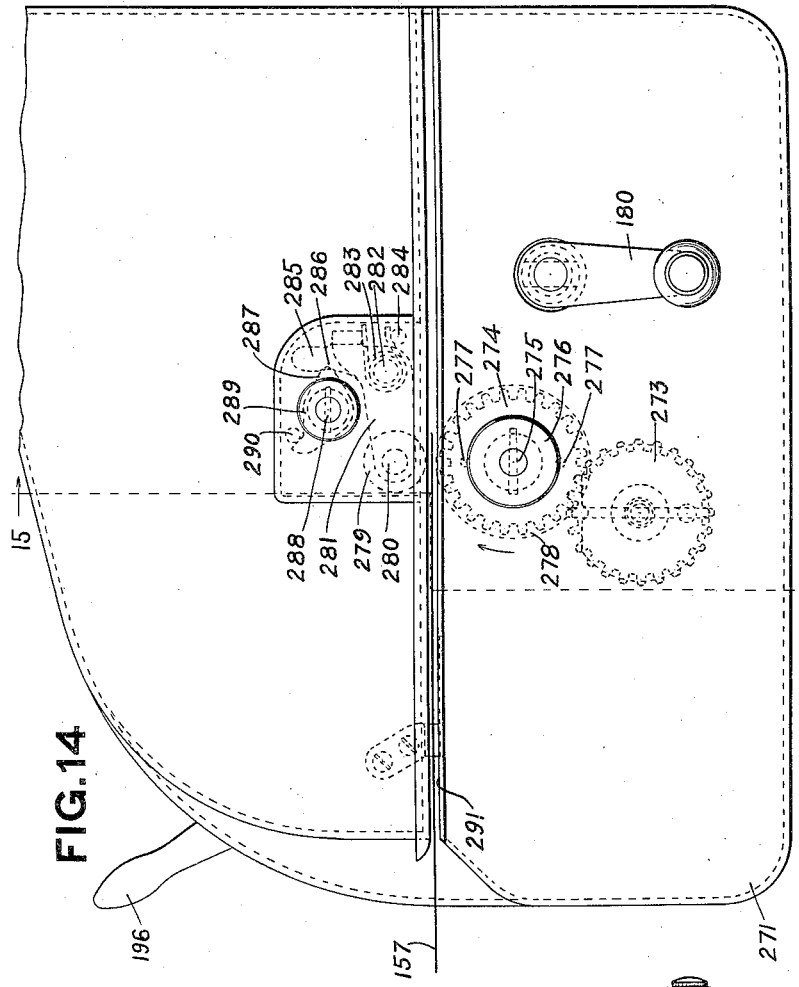
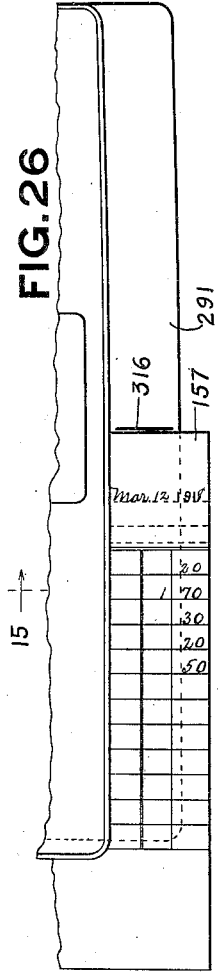
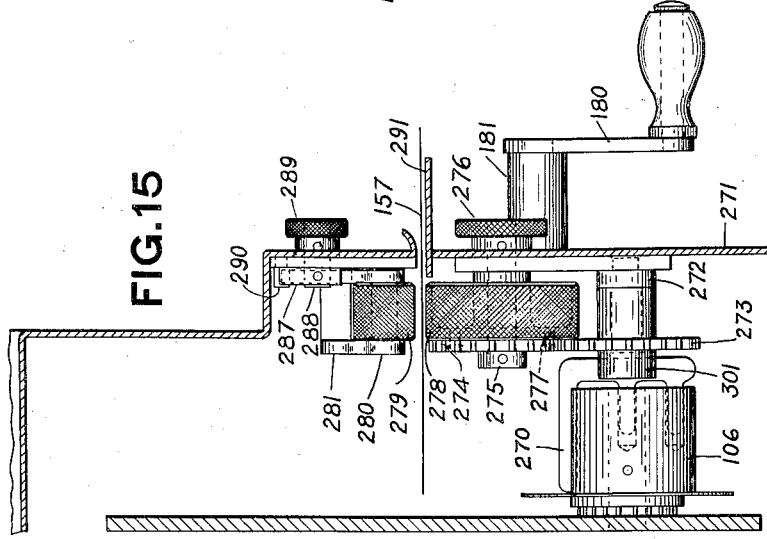
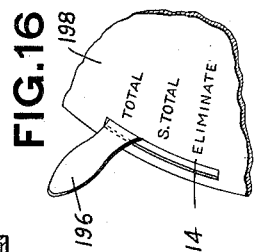
Inventor
EDWARD J. VON PEIN Sept. 29, 1925

E. J. VON PEIN 1,555,534

CASH REGISTER

Original Filed March 29, 1919   10 Sheets-Sheet 10

FIG. 17

```
        JOHN DOE
      GROCERIES AND MEATS
       239 MAIN STREET
Clerk  a                    Mar 12 1918
Sold to   Richard Roe
Address   347 Vine St E   2.75  1 Bu. Potatoes   2 75
```

FIG. 21

```
EC 20. 20
ER  7. 50
EP  5. 00
E   0. 00
E   2. 75
       20
    1. 70
       30
       20
       50
* 0002. 90
  TOTAL 2. 75
       30
       35
    1. 25
       30
       25
       35
       20
    1. 70
       20
       60
       20
       15
S 0008. 60
  TOTAL 25
       10
       10
       10
* 0009. 15
  TOTAL
```

```
        JOHN DOE
      GROCERIES AND MEATS
       239 MAIN STREET
Clerk  a                    Mar 12 1918
Sold to   Richard Roe
Address   347 Vine St 2.75  1 Bu. Potatoes   2 75
      30  3 Bread            30
      35  1 lb Coffee        35
    1.25  3 lb Roast        1 25
      30  3 cans Tomatoes    30
      25  2 cans Corn        25
      35  1 Doz Eggs         35
      20  2 lb Sugar         20
    1.70  1 Sack Flour      1 70
      20  2 lb Crackers      20
      60  1 lb Tea           60
      20  1 lb Lard          20
      15  2 lb Starch        15

S 0008. 60
  TOTAL
```

FIG. 18

```
        JOHN DOE
      GROCERIES AND MEATS
       239 MAIN STREET
Clerk  a                    Mar 12 1918
Sold to   Richard Roe
Address   347 Vine St 20  2 lb sugar         20
    1.70  1 Sack Flour      1 70
      30  2 cans Peas        30
      20  3 Bread            20
      50  1 lb Butter        50

* 0002. 90
  TOTAL
```

```
        JOHN DOE
      GROCERIES AND MEATS
       239 MAIN STREET
Clerk  a                    Mar 12 1918
Sold to   Richard Roe
Address   347 Vine St 25  1/2 lb Baking Powder  25
      10  1 Mustard             10
      10  2 Soap                10
      10  1 lb Rice             10

* 0009. 15
  TOTAL
```

Inventor
EDWARD J. VON PEIN

Carl Beust
Henry E Stauffer
Attorneys

Patented Sept. 29, 1925.

1,555,534

UNITED STATES PATENT OFFICE.

EDWARD J. VON PEIN, OF DAYTON, OHIO, ASSIGNOR TO THE NATIONAL CASH REGISTER COMPANY, OF DAYTON, OHIO.

CASH REGISTER.

Application filed March 29, 1919, Serial No. 285,948. Renewed February 26, 1925.

*To all whom it may concern:*

Be it known that I, EDWARD J. VON PEIN, a citizen of the United States, residing at Dayton, in the county of Montgomery and State of Ohio, have invented certain new and useful Improvements in Cash Registers, of which I declare the following to be a full, clear, and exact description.

This invention relates to accounting machines and more particularly to those which in addition to making a record of transactions in totalizers make an additional printed record of all transactions and in particular accumulate totals and print them.

The principal object of this invention is to provide on a record strip and simultaneously on an inserted slip items and totals of items together with a character indicating a single item transaction and other characters indicating whether the total printed represents the summation of several of the items of a transaction or of all the items running over one or more slips.

A further object is to provide means whereby several transactions entered in a recording totalizer are added and a total printed, and coincident with the same operation, all amounts previously entered therein removed therefrom and the ports brought to zero position.

With these and incidental objects in view the invention consists in certain novel features of construction and combinations of parts, the essential elements of which are set forth in the appended claims, and a preferred form of embodiment of which is hereinafter described with reference to the drawings which accompany and form part of the specification.

Of said drawings:

Figs. 1<sup>A</sup> and 1<sup>B</sup> taken together constitute a plan view of the type of machine shown in the Letters Patents to Cleal 718,565 and 773,060 granted January 13, 1903 and October 25, 1904 respectively, with this invention applied thereto.

Fig. 2 is a transverse sectional view taken on the line 2—2 of Fig. 1<sup>A</sup> looking in the direction of the arrows.

Fig. 3 is a transverse sectional view taken on the line 3—3 of Fig. 1<sup>A</sup> looking in the direction of the arrows.

Fig. 4 is a detailed view of the recording totalizer taken on the line 4—4 of Fig. 1<sup>A</sup> looking in the direction of the arrows.

Fig. 5 is a transverse sectional view taken on the line 5—5 of Fig. 1<sup>B</sup> as indicated by the arrows.

Fig. 6 is a detailed view of the recording totalizer.

Fig. 7 is a transverse sectional view taken on the line 7—7 of Fig. 1<sup>B</sup> according to the arrows.

Fig. 8 is a transverse sectional view of the printing mechanism taken on the line 8—8 of Fig. 1<sup>B</sup> looking with the arrows.

Fig. 9 is a detailed view of the type carrier gear train.

Fig. 10 is a detailed sectional view of the turn to zero clutch mechanism taken on the line 10—10 of Fig. 11 as viewed in the direction of the arrows.

Fig. 11 is a transverse sectional view taken on the line 11—11 of Fig. 10 as viewed in the direction of the arrows.

Fig. 12 represents an elevation of the item and total printing mechanism.

Fig. 13 is a detailed view of the type carriers and type block.

Fig. 14 represents an elevation of the printer hood showing mechanism for feeding the inserted slip.

Fig. 15 is a vertical sectional view taken on the line 15—15 of Fig. 14.

Fig. 16 is a perspective view of the recording totalizer control lever and its index plate.

Fig. 17 represents an inserted slip printed when the recording totalizer control lever is in the "Eliminate" position.

Fig. 18 represents an inserted slip printed when the recording totalizer control lever is in the "Total" position, as shown in Fig. 16.

Fig. 19 represents an inserted slip printed when the recording totalizer control lever is in the "Sub-total" position.

Fig. 20 represents an inserted slip, which is to be taken in combination with the sub-total slip shown in Fig. 19, printed with the recording totalizer control lever in the "Total" position.

Fig. 21 represents a portion of the record strip containing a record of all items shown on the inserted slips represented by Figs. 17, 18, 19 and 20, and also special items recorded by this accounting machine.

Fig. 22 is a detailed view of the pawl and gear for preventing a retrograde movement of the totalizing driving mechanism.

Fig. 23 is a detailed end view of a pawl and gear for preventing a retrograde movement of the totalizing crank.

Fig. 24 is a detail view of the special key cam line.

Fig. 25 is a detail view of the recording totalizer wheels.

Fig. 26 is a partial plan view of the printer hood showing an inserted slip in proper position.

Described in general terms the machine comprises a series of manipulative devices such as keys which operate mechanism for printing the items on the record strip, and inserted slip and for entering into totalizers. These keys are arranged upon a shaft and they are similarly operated, each key imparting an individual characteristic movement to actuating devices which in turn actuate the elements of the totalizers in accordance therewith and also set up type carriers which may have an impression taken therefrom upon both a record strip and an inserted slip.

The machine is provided with two totalizers, and for convenience the left hand totalizer will be referred to in the specification as the "Grand totalizer" while the right hand totalizer will be known as the "Recording totalizer."

When it is desired to print a total for instance, on the slip which is to be handed to the customer, the actuating devices are set in motion by a total printing crank and the extent of movement and the indication thereof are determined by stepped scroll plates connected to the movable element of the "Recording" totalizer, connections being made at the same time to take an impression on the record strip and inserted slip and to feed the record strip. Suitable aligning devices are actuated by the keys and total printing crank to align the type so as to properly record the items and the totals.

Figure 1:
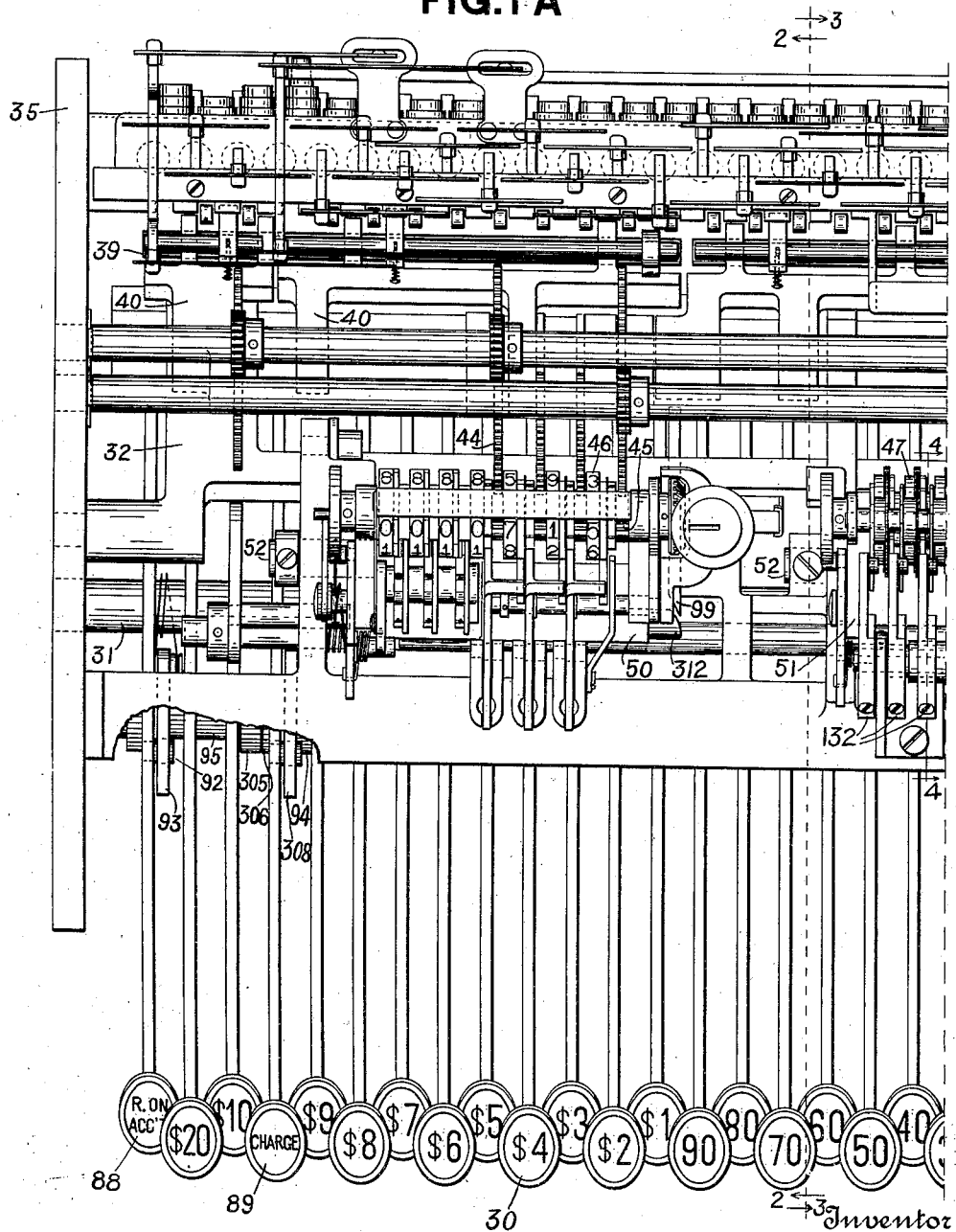
Figure 1:
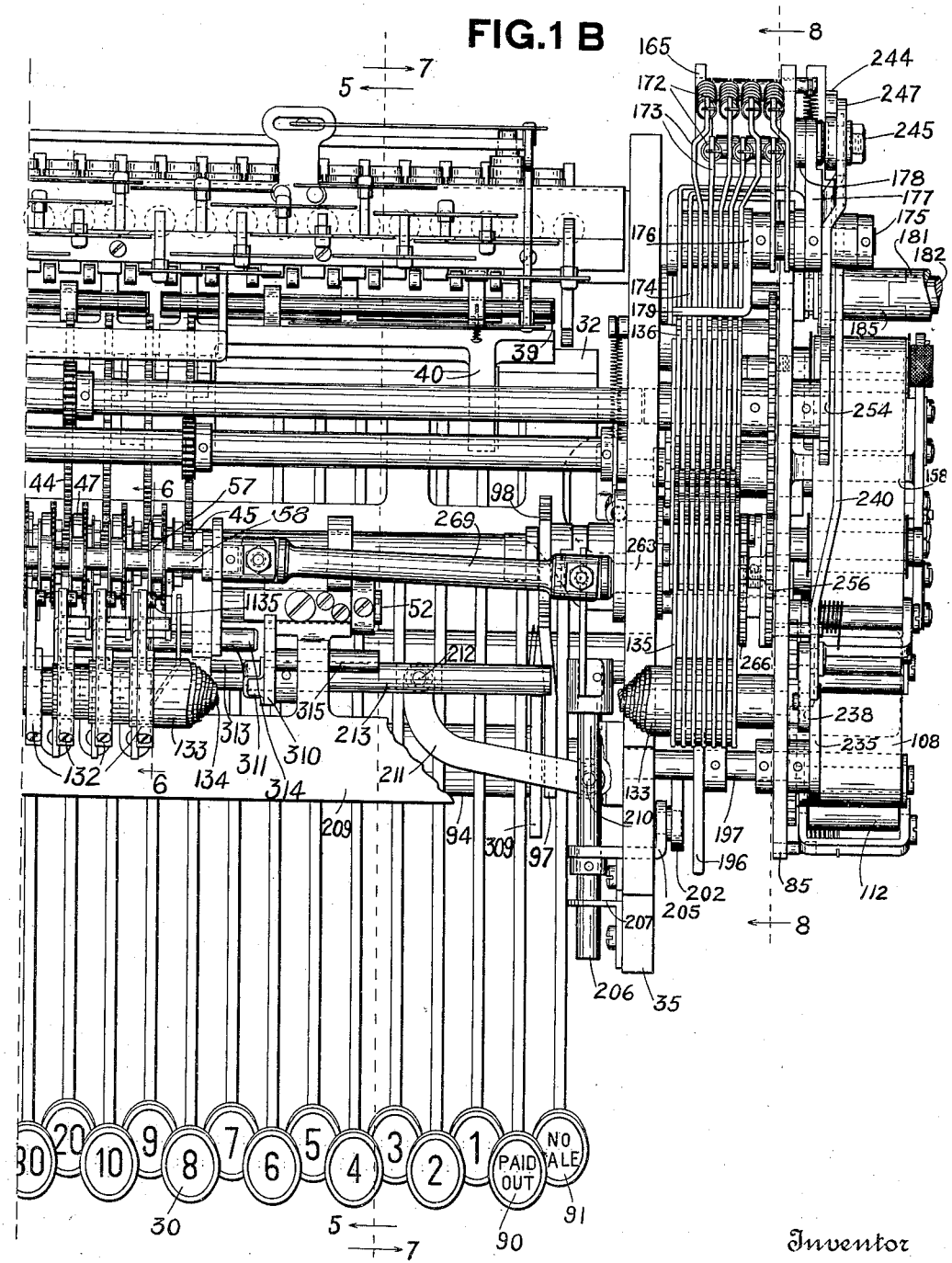

Referring specifically to the machine embodying the invention and at this time bearing in mind that all the action thereof is started by the keys prominent at the front of the machine the transfer of motion from the keys to the other parts will now be set forth. The keys 30 are (Fig. 2) pivoted upon a transverse shaft 31 and when depressed raise a key coupler 32 pivoted on studs 33, having bearings in side frames 35. The oscillatory movements of the key coupler reciprocate a double rack 34 (Fig. 7) to give a complete revolution to a main operating shaft 54 at each complete operation of a key. Attached to the rear end of each key is an upright member 36, said uprights being formed with graduated slots 37 adapted when the keys are operated to engage transverse rods 39 carried by rocking frames 40 pivoted on a transverse rod 41 to rock said frames different distances, according to the keys depressed. Each of the frames 40 has attached thereto a registering segment 44 (Figs. 1ᴬ, 1ᴮ and 2).

In the present machine, there are four rocking frames 40, each of which is provided with a registering segment 44. By referring to Figs. 1ᴬ and 1ᴮ, it will be noted that there are eight registering segments, four of which are allotted to the left hand or "Grand" totalizer, while the remaining four are allotted to the right hand or "Recording" totalizer. The corresponding ones of the two sets of registering segments are coupled together to operate simultaneously in the manner fully set forth in the aforesaid Cleal patents.

When the keys 30 are operated, the registering segments 44 are moved different distances to operate the two totalizers which are rocked into position to be actuated by the registering segments by means of throwing devices at appropriate times during the operation of the machine. These throwing devices are the same for each counter and are shown in Fig. 5. The throwing devices comprise cam disks 53 mounted on the main operating shaft 54 and acting upon rolls 56 carried by the rearward arms of throwing levers 55, pivoted on the rocking frames 50 and 51 carrying the two totalizers. The forward ends of the throwing levers 55 act upon spring-pressed plungers 312 and 313 (see also Figs. 1ᴬ and 1ᴮ) carried by said rocking totalizer frames 50 and 51.

The spring-pressed plungers 312 and 313 in the totalizer frames 50 and 51 are mounted to slide in the frames but are yieldingly held by a spring (not shown) in their outermost positions.

The purpose of providing spring-pressed plungers 312 and 313 against which the throwing levers 55 act will be hereinafter set forth. It is sufficient here to state that when the cam 53 acts upon the throwing levers 55, the forward ends of said levers engaging the plungers will rock the totalizer frames 50 and 51 about their pivots so as to engage the totalizers carried thereby with the two sets of registering segments 44.

The two totalizers are of the usual form fully described in the aforesaid patents to Cleal, and it is sufficient to state here that each comprises a plurality of rotatable elements, each appropriate to a numerical order. Each totalizer carries seven elements, the four of lower numerical order being each provided with a small pinion 45 (Fig. 6) which, when the totalizer frames are rocked to engage the totalizer with the registering segments 44, will mesh with the registering segments so that the rocking movement of the registering segments will be transmitted to the elements of the totalizer. The three additional elements of each totalizer are for the purpose of giving a higher registering capacity to the totalizers, and are adapted to receive the overflow or transfer movements from the wheels of lower order. Any suitable form of transfer mechanism may be employed but it is preferred to employ the form shown in the present application. As this form forms no part of the present invention and is fully set forth in the aforesaid Cleal patents it will not be described here. The "Grand totalizer" elements 46 are provided with numerals on the periphery of the elements so as to permit the reading of the grand total which has been entered upon the "Grand" totalizer.

The right hand or "Recording" totalizer however is not provided with the elements permitting the amount on the totalizer to be read. Each of the elements of the recording totalizer is rotatably mounted on a turn-to-zero shaft 49 and is rigidly connected with a larger pinion 47 (Figs. 6 and 25) which meshes with a pinion 48 rotatable on a shaft 58 mounted just above the "Recording" totalizer and supported by brackets carried by the rocking totalizer frame 51. Each of the pinions 48 has rigidly connected thereto a stepped scroll plate 57. By reason of the gear connections just described any movement of the totalizer elements of the recording totalizer will be transmitted directly to the stepped scroll disks 57 so that said disks are caused to rotate to a position appropriate to the total of the items entered on the "Recording" totalizer and thus to accumulate the totals. Instead of the usual indication on the circumference there have been provided steps on scroll whereby the arms 132 (Fig. 5) and pins thereon 1135 which are brought into contact with the scroll plates at varying radial distances from the center thereof transmit to printing mechanism the amount accumulated on the "Recording" totalizer, which action is dealt with in detail later.

Each of the segments for the right hand or "Recording" totalizer also meshes with a pinion 65 (Fig. 5). The pinion 65 which meshes with the registering segment 44 of highest order of the set just above mentioned is fast on the left hand end of the shaft 67 while the other three pinions 65 are each fast to the left hand end of one of a set of nested or telescopic sleeves 66. The sleeves 66 and the shaft 67 extend to the right and on their right hand ends carry connections for setting printing wheels for printing the detailed transactions on the record strip in a manner hereinafter described.

Included in the operating mechanism, are special keys 88, 89, 90 and 91 (Figs. 1<sup>A</sup> and 1<sup>B</sup>). Special key 88 (Fig. 1<sup>A</sup>) has mounted in its forward end a stud 92 which engages with a cam plate 93 (see also Fig. 24) fastened to a shaft 95. Also fastened to said shaft at the right hand side of the machine is a segment arm 97 (Figs. 1<sup>B</sup>, 7 and 24) which meshes with a pinion 98 mounted upon one of the nested sleeves 66, above described, which is to transmit the motion thereof to the printing mechanism and to a type carrier which has thereon the letters "R, C and P" corresponding respectively to keys 88, 89 and 90. Fastened to shaft 95 and near the left side of the machine is a clutch member 305 (Fig. 24) having a lug 307, engaging with a slot 306 in the left end of a sleeve 94 surrounding the shaft 95. The slot 306 in the sleeve 94 is made larger than the lug 307 of the clutch member 305 for the purpose of permitting the rocking of shaft 95 by the key 88 (Figs. 1<sup>A</sup> and 24) without imparting motion to sleeve 94. Fastened to sleeve 94 are cam plates 308 and 309 (Figs. 2, 7 and 24) which engage studs in special keys 89 and 90 respectively. The relation between the slot 306 in the sleeve 94 and the lug 307 of the clutch member 305 is such, that the rotating motion of sleeve 94, caused by the operation of the special keys 89 and 90 through their respective connections to the sleeve, will be imparted to the shaft 95 and thereby to the type carrier. The slots in the cam plates 93, 308 and 309 are of varying formation so as to rotate the type carrier different distances to bring into printing position a letter representing the special key operated.

Mounted upon the sleeve 94 (Figs. 2 and 24) is an arm 99 which when special keys 89 and 90 are operated displaces the pin 312 thereby rendering ineffective the mechanism for engaging the "Grand" totalizer with the actuators so that items of this character may be recorded upon the record strip and inserted slip and be entered in the "Recording" totalizer but not in the "Grand" totalizer.

Special key 91 is a "No sale" key and has no connection with the totalizers and merely opens the cash drawer, indicating the character of the transaction and recording ciphers on the record strip, both operations being well known in the art.

The items entered on the totalizers and on the record strip by the operation of the keys will be shown to the purchaser by a series of indicators 100 (Fig. 3) which are carried on the upper ends of vertical rods 101, the lower ends of said rods being supported by the rear ends of the keys. A supporting frame, which is not shown but is well known in the art, is rocked beneath the projection 102 extending from the rods 101 and supports said rods in elevated position so as to indicate the item recorded on the totalizers, record strip and inserted slip.

Referring again to the nested sleeves 66 upon the shaft 67 suitably mounted in the frame work of the machine (Figs. 5, 8 and 9) there are to be found on the right hand end and fast thereto gears 68 which mesh with pinions 69 fast upon the left hand ends of coupling shafts 70 suitably mounted in the frame of the machine. Similar pinions 71 fast upon the right hand ends of said coupling shafts engage gears 72 secured to nested sleeves 73 surrounding a transverse shaft 74. Secured to sleeves 73 and shaft 74 are item type carriers 75 (Figs. 12 and 13). This method of connecting the sleeving for the printing wheels is well known in the art and is for the purpose of bringing the printing wheels in proper order to print correctly on the detail strip.

In order to align the type carriers 75 (Fig. 12) spring pressed pawls 80 are thrown into contact with aligning notches 81 formed on the periphery of disks 96 fast on and moving with the type carriers 75 (Fig. 13). The spring pressed pawls 80 are carried in the frames 79 fast on the shaft 78 which extends through the frame of the machine inwardly and parallel to the driving shaft 54. A forked member 77 (Fig. 8) cooperates with a cam on the driving shaft 54 to throw the spring pressed pawls 80 into the notches 81 for alining the type wheels 75.

Simultaneously with the engagement with the aligning pawls 80 in the notches 81 of the disk 96 a platen 82 will be released to permit of its taking an impression from the adjusted type 75. This platen 82 is mounted in the forward end of an arm 83 (Figs. 8 and 12) pivoted upon a stub shaft 84 held by a bracket fastened to a printer frame 85, which is an adjunct to the main frame of the machine and carries the printing mechanism. This arm 83 is held by a spring actuated plunger 87 in contact with a cam 86 (Fig. 8) secured to the driving shaft 54. The form of this cam 86 is such that by a half rotation of the shaft 54 the cam will rock the arm 83 about the stub shaft 84 against the action of the spring actuated plunger 87 and as the high point of the cam 86 passes the point of contact with lever 83 said lever will be released to permit the spring actuated plunger 87 to carry the platen 82 into contact with the aligned type of the item type carrier 75.

The printing from the foregoing type mechanism is performed upon a record strip 103 (Figs. 12 and 21) which is run from a supply roll 104 around two guide rolls 105 to a receiving roll 106 mounted upon the shaft 107 carried in the printer plate 85. This record strip in passing from the supply roll to the receiving roll passes between the type carrier 75 and the platen 82 so that when the platen is operated, as previously described, an impression will be made on said strip. To secure a visible impression a suitable continuous inking ribbon 108 is wound around guide rolls 109 projecting from the printer plate 85, and over an inking roller 110 mounted upon a stub shaft 111 projecting from the printer plate. This ribbon 108 is held taut by a tension roll 112 under spring tension, supported in a frame mounted upon a stub shaft 113 projecting from the printer plate. The ribbon is fed at each operation of the recording keys 30 and also of the total printing crank to bring a new inking surface between the platen and the type. The ink ribbon is fed by a train of gears connecting the inking roll 110 to the record strip storage roll 106, said train of gears being actuated at each operation of the key coupler 32, as will be described.

The reciprocatory stud 33 upon which the key coupler oscillates has fastened to it an arm 120 (Fig. 8) formed with a downwardly projecting portion carrying a pivoted block 121 which slides in a suitable slot in a plate 118 thereby inducing a to and fro motion in said plate upon an operation of the key coupler. Near each end of said plate 118 and projecting through suitable slots in the plate, are studs 119 upon which the plate slides. Pivoted upon said plate 118 by means of a stud 116 is a spring held pawl 115 which at each operation of the coupler 32 moves the ratchet wheel 114 fast on the shaft 107. This wheel is retained against retrograde movement by a spring actuated pawl 122. Thus the shaft 107 (Fig. 12) carrying fast thereon the gear 117 and receiving roll 106 feeds the record strip 103 and transmits the necessary motion through a train of gears to the inking roll 110.

The total printing crank 180 (Fig. 14) which primarily serves as an actuator in connection with the printing of the total is mounted upon a sleeve 181 (Fig. 12) surrounding the stud 182 supported in the plate 85, and rotates two revolutions in a clockwise direction at each operation. The sleeve 181 clutches with a companion sleeve 185 (Fig. 1ᴮ) which is attached to gear 183 (Fig. 12) meshing with a gear 156 which is fastened on a driving shaft 150 (Figs. 12 and 23). As gear 183 has half as many teeth as gear 156 it is necessary for the total printing crank to make two complete turns in its operation to rotate the shaft 150 one complete turn. Pivoted on a stud mounted in plate 85 (Fig. 12) is a spring controlled pawl 184, the action of which is to maintain its point between the teeth of gear 156 so that shaft 150 can rotate only in a counter clockwise direction. Securely fastened to the gear 156 is a plate 186 carrying a projecting pin 187 which engages a branch 189 of an arm 191 and is provided with a shoulder 188 which engages the end 190 of the arm 191 which is pivoted upon a stud 192 mounted in the plate 85. Attached to arm 191 is a spring 193 which when the end 190 of the arm 191 is released from the shoulder 188 of the plate 186 by a slight clockwise rotation of the shaft 150, it will swing the arm 191 downward until it contacts with a pin 194. The end 190 of the arm 191 being disengaged from the plate 186 the crank 180 can now be rotated to perform its previously described functions, at the end of which the pin 187 mounted in the plate 186 comes into contact with the branch 189 of the arm 191 and the arm is raised to a position so that the end 190 shall be in the path of the shoulder 188 of the plate 186 and thus the shaft 150 is stopped at the completion of its cycle. To enable the shaft 150 to slightly rotate in a clockwise direction, as previously mentioned, for the purpose of unlocking the gear 156 tooth 195 is removed for substantially one-half of its width (Figs. 22 and 23).

Fast upon shaft 150 are two open cams 169 and 170 (Fig. 8) which impart an oscillating motion to a member 165 by being in contact with anti-friction rollers 167 and 168 respectively. Said rollers are carried on studs mounted in the member 165 which is pivoted upon the shaft 166. Fast to the oscillating member 165 is a segment 129 which meshes with a partial gear 128 which is fastened to an arm 124 pivoted on shaft 107. Freely mounted on a stud 126 carried in the arm 124 is a spring controlled pawl 125 engaging with the ratchet wheel 114 for imparting motion to the ratchet wheel 114, the shaft 107 and gear 117 (Fig. 12) and also to the train of gears and inking roll 110, above described, each time a total is recorded by the total printing crank. The parts are so proportioned that a larger movement is given to the inking ribbons. record strip, and inserted slip during total printing than during item printing.

Having described the feeding of the inking ribbon and inking roll and the movement thereof, it is in order to refer to the record strip 103 (Fig. 12) which is fed by the advance of the ratchet wheel 114 imparted by the operation of the keys and also by the motion imparted by the turning of the total printing crank 180. Reference to the above description of the actuation of the inking roll shows that the shaft 107 has two actuations and as the record strip storage roll 106 is fast on said shaft 107 it necessarily partakes of the same motion, which is evidenced in Fig. 21 where the items are shown and the totals taken therefrom indicate the character of the actuation of shaft 107 by the key coupler to be of lesser extent than that of the total printing crank.

The record strip may be manually fed by the record strip storage roll 106 (Figs. 12 and 15) which is provided with a clamp 270 to fasten the end of the record strip 103 to said roll. Securely fastened to a printer hood 271 is a stub shaft 272 which carries a gear 273 with a hub 301 slotted to engage with the clamp 270. As said gear meshes with a gear 274 which is securely fastened to one end of a shaft 275 freely mounted in the printer hood 271, which shaft 275 has secured thereto outside the printer hood a knurled knob 276, by this means the record strip may be manually operated from the exterior of the cabinet as well as mechanically actuated within in connection with feeding operations described above.

In order to place the feeding mechanism for the slip in action there is securely fastened to the gear 274 by rivets 277 a knurled wheel 278 which comes in contact with the underside of an inserted slip 157 (Figs. 14, 15 and 18), this slip having been placed upon the table 291 and inserted between the knurled wheels 278 and 279. The knurled wheel 279 is directly above knurled wheel 278 and contacts with the upper side of the inserted slip 157. Said knurled wheel 279 is freely mounted upon a shaft 280 carried in a frame 281, pivoted on a stud 282 mounted in the printer hood 271 (Fig. 15). Also mounted upon the stud 282 is a torsion spring 283, one end of which engages the frame 281, the other end of which rests upon a pin 284 projecting inwardly from the printer hood. The frame 281 has a vertical projection 285 with an angular notch 286. Engaging with the notch 286 is a lever 287 securely fastened upon a shaft 288 freely mounted in the printer hood 271. On the outer end of shaft 288 is a knurled knob 289. Projecting from the printer hood is a pin 290 which acts as a stop for the lever 287 to govern the rotation of the knurled knob 289, both in a clockwise direction and a counter clockwise direction. The drawings show the knurled wheel 279 in a position to receive the inserted slip 157 (Fig. 18). By turning the knurled knob 289 in a counter clockwise direction (Fig. 14), disengaging the lever 287 from the notch 286 in frame 281, the knurled wheel 279 will contact the upper side of the inserted slip and, by the action of the spring 283, press it against the knurled wheel 278. The inserted slip 157, being firmly gripped by the knurled wheels 278 and 279, will travel in a rearward direction on the table 291 of the printer hood 271 (Fig. 15) during the operation of the keys 30 and the total printing crank 180. The movement of travel of said slip at each operation by the keys 30 is equal to the space between lines on said slip as shown by the drawings (Figs. 17 to 20).

The type used in the printing process in this machine comprises that which is associated with two sets of nested sleeves 66 and 133.

The nested sleeves 66 and connections for operating the printing wheels 75 have already been described and the printing connections associated with the sleeves 133 will now be referred to. The sleeves 133 (Figs. 3, 5 and 7) are suitably supported by a bracket carried by the framing of the machine and by the right hand side frame 35. At their left hand ends the sleeves 133 and shaft 134 have each fast thereon an arm 132 (Fig. 1B). Each of the arms 132 is located adjacent one of the stepped scroll plates 57 and each arm carries a pin 1135 adapted to be brought into contact, in a manner hereinafter described, with the steps of the plates 57 which have been brought into effective position. At their right hand ends the sleeves 133 and shaft 134 carry segments 135 (Figs. 1B 7 and 8), whose toothed portions mesh with those of the partial gears 136 mounted to turn on a shaft 137. At the rear the partial gears 136 engage with segmental gears 174 mounted to turn on a shaft 175. Extensions upon said gears 174 (Figs 1B and 8) are disposed to the rear where connection 173 is made with springs 172. Referring to Fig. 1B it will be seen that two of the extensions of the gears 174 are yoked to the right or outside of the other four members for the reason that there is not sufficient space on the left to accommodate the springs. The springs 172 at their lower ends are connected with grooved rods 171 extending within two arms on the oscillating member 165 which has previously been described.

As the frame 165 is rocked in a clockwise direction (Fig. 8) this movement will be transmitted to the arm 176 through the medium of the link 178, arm 177 and shaft 175 (Fig. 12). As the arm 176 (Figs. 1B and 8) is moved in a clockwise direction in this manner the angle 179 formed thereon will tend to be withdrawn from contact with the segments 174. The segments 174 are however held in contact with the arm 176, by the springs 172 which are further tensioned by the clockwise movement of the frame 165, and the segments 174 will travel after the arm 176. Through the connections including the segments 136 and 135, the sleeves 133 and shaft 134 will be rocked in a clockwise direction (Fig. 5) when the segments 174 are rocked as just above described. This rocking of the sleeves 133 and shaft 134 in a clockwise direction will carry the arms 132 in a similar direction until each of the pins 1135, carried by said arms 132, is brought into contact with the positioned step of its appropriate stepped scroll plate 57, thus arresting further movement of the arms 132 and consequently arresting further movement of the segments 135, 136 and 174.

The segments 136 are provided with downwardly extending arms carrying segmental racks 138 which mesh with pinions 139 carried by the left hand ends of nested sleeves 140 carried by a shaft 141. The sleeves 140 carry on their right hand ends type wheels 130 for printing a total. It will thus be seen from the above described connections that as the segments 136 are moved by the action of the segments 174, which movements are arrested by the contact of the pins 1135 with the stepped scroll plates 57, the type wheels 130 will be moved to positions representing the adjustment of the stepped control plates 57 which adjustment is appropriate to the total of the items which have been entered on the "Recording" totalizer. After an impression is taken from the type wheels 130, in a manner hereinafter described, the frame 165 is rocked in a counter-clockwise direction (Figs. 8 and 12) which movement will be transmitted to the arm 176 through the medium of the link 178 and thus restore all of the segments 174 to the normal position shown in Fig. 8. This restoration of the segments 174 will likewise effect the restoration of the segments 136 and 135 thus lifting the arms 132 and their pins 1135 out of contact with the stepped scroll disks 57. This movement at the same time is transmitted through the segments 138 to the total printing wheels 130, thereby restoring said total printing wheels to normal zero position.

Means for aligning each of the type wheels 130 is provided by timing the engagement of a pawl 143 with a notched disk 142. These said notched disks are provided to align the total type carriers at the time of printing a total on the record strip and inserted slip. Engaging the notches is a pawl 143 mounted upon adjustable eccentric hubs 144 pivoted on a rod 145 carried in the frame work of the machine. Fulcrumed on rod 145 is a frame 146 which supports pawl 143 to control its engagement with the notched disk 142 (Figs. 8 and 13). Extending downward and being a part of frame 146 is an arm 147. The lower end of this arm carries an antifriction roller 148 which engages with a cam race 149 in a disk 226.

Said disk 226 is mounted on shaft 150 which is rotated in a counter-clockwise direction each time the total printing crank 180 is operated, thereby conveying motion to the aligning pawls 143, all of which is well known in the art.

Simultaneously with the engagement of the aligning pawls 143 in the notches of the disks 142, platens 151 (Fig. 12) will be raised to cause an impression to be taken from the type plate 131 and the aligned type 130. In order to make a legible impression upon the inserted slip 157 and upon the record strip 103 the platens 151 are mounted in the forward end of an arm 152 which is pivoted upon a stud 153 in the printer plate 85. Said arm carries an anti-friction roller 154 which engages a cam race 155 formed in the side of a gear 156. This gear is securely fastened on shaft 150 and rotates in a counter clockwise direction at each rotation of the total printing crank. The cam race 155 is formed so as to carry the platens 151 into contact with the type plate 131 and the aligned type 130. The action of the arm 152 causes a record of the type on both the type plate 131 (Fig. 13) and type carriers 130 to be made upon the record strip 103 and inserted slip.

Referring more particularly to the type plate 131 mounted upon a block securely fastened to the printer frame, it will be seen that this plate prints the word "Total" on both the record strip and inserted slip each time the total printing crank is operated.

For the purpose of making a legible impression upon the inserted slip 157 (Fig. 18) as well as the record strip 103, a second continuous inking ribbon 158 is provided. This ribbon passes around guide rolls 159 (Fig. 12) projecting from the printer plate 85 and over an inking roller 160 which is mounted upon a stub shaft 161 projecting from the printer plate. The inking ribbon 158 is held taut by a tension roll 162 supported in a frame mounted upon a stub shaft 163, projecting from the printer plate. Securely fastened to the inking roller 160 is gear 164 which meshes with one of the train of gears provided to feed the inking ribbon 158 which has been previously described.

There is a control over the printing action of the totalizing crank mechanism exercised by a lever 196 (Fig. 8) which is securely fastened to a shaft 197 loosely mounted in the frame of the machine. Said control lever is manually placed in one of three positions as indicated by an index plate 198 (Fig. 16) forming part of the printer hood 271. Mounted in the extreme lower end of said control lever (Fig. 8) is a pin 199 which engages with a slot in an oscillating plate 200 pivoted upon a stub shaft 201 mounted in the frame of the machine. Attached to the plate 200 is a slotted plate 202. Fitted in a slot 203 of plate 202 is a stud 204, carried in an arm 205, (Figs. 1ᴮ, 7 and 8) mounted upon a rod 206. Said rod 206 is slidably supported at one end by a bracket 207 mounted upon the frame of the machine and at the other end by a lug 208 of the tie bar 209 (Fig. 7). Pivoted on a stud 210 on the lower side of a rod 206 is a horizontal link 211. The opposite end of said link is pivoted on a stud 212 in the transverse rod 213 which is supported by lugs on the tie bar 209. The transverse rod 213 (Fig. 1ᴮ) has attached thereto an arm 310 mounted upon which is a formed member 311 contacting the end of the spring pressed plunger 313 carried in the rocking frame 51. Therefore, when the control lever 196 is moved to the "Eliminate" position the spring pressed plunger 313 is moved further into the rocking frame 51 by the sliding to the left of the transverse rod 213. In this position a recess in the under side of the plunger 313 similar to that in the plunger 312 shown in Fig. 2 is in alinement with the throwing lever 55 so that the lever will rock idly and will not move the frame 51 to carry the pinions 45 into mesh with the segments 44. This means for rendering the totalizer throwing lever ineffective is substantially the same as that shown in the Cleal Patent No. 773,060 to which reference has been made. Simultaneously with the forcing of plunger 313 into the frame 51 (Fig. 1ᴮ) a stud 314 mounted in the frame 51 will enter a hole in the arm 310, the purpose of which is to lock the frame 51 in its normal disengaged position. A stud 315 mounted in the arm 310 and guided by a hole in a lug on tie bar 209 is for the purpose of preventing a rotating motion to said arm. Formed in the oscillating plate 200 (Fig. 8) are three angular notches 215, which correspond to the three positions on the index plate 198 (Fig. 16). A lever 216, the upper end of which is formed to fit the notches in plate 200 (Fig. 8), is held in contact with said plate by a spring 217, one end of which is fastened to stud 218 mounted in the lever 216 and the other end is hooked around a stud 219 mounted in the frame of the machine. The lever 216 is pivoted on a stud 220 mounted in the frame of the machine. The lower end 221 of said lever is bifurcated so as to engage a stud 222 mounted in a slidable plate 223 carried on the studs 119 by means of suitable slots therein. The plate 223 at its extreme right end 224 is formed so as to engage with a notch 225 in the periphery of the disk 226, previously described. Near the forward end of plate 223 is a vertical projection 227, which engages with a projection 228 of the arm 120, previously described. While the control lever 196 is passing from one position to another the plate 200 will cause the lever 216 to oscillate in a counter-clockwise direction and being connected to the sliding plate 223 will cause the said plate to move toward the rear of the machine bringing the projection 227 directly under the shoulder 228 of the member 120 thereby locking against operation the keys 30. Simultaneously the extreme rear end 224 of plate 223 will pass under the shoulder 225 of the disk 226 which action will lock against operation the total printing crank 180 (Fig. 15).

A further purpose of this mechanism is to prevent the changing of the control lever 196 (Fig. 8) from one position to another during the operation of the keys 30. This result is obtained by the member 120 swinging downward in the path of the projection 227 on the plate 223. Said control lever is also locked against manipulation during the turning of the total printing crank 180 by the disk 226 which rotates in a counter-clockwise direction in the path of the sliding plate 223 at the point 224. The disk 226 which locks the lever 196 will also lock against manipulation the keys 30 during the turning of the crank 180. This is accomplished by the rotation of the disk 226 preventing a sliding motion to the plate 118 which in turn prevents the rocking of the member 120 and thereby the raising of the key coupler 32 (Fig. 2).

In order to record the position of the lever 196 occupied during an operation of the machine it is connected to a type carrier 234 (Fig. 13) by a link 229 (Fig. 8) pivoted on a stud 230, carried in the lower end of said lever. The other end of link 229 is pivoted to a stud 231 carried in an arm 232 which is mounted on one end of a sleeve 233 (Fig. 13) of the total type carriers. Mounted upon the other end of sleeve 233 is the type carrier 234 which contains characters representing the first two words on the index plate 198.

The control lever 196 also positions another type carrier 293 (Fig. 13) carrying the letter "E" to indicate on strip and slip the "Eliminate" position of lever 196. By means previously described said control lever is connected to rod 206 (Fig. 7). Mounted upon the rear end of said rod is an arm 294 which engages with a stud 295 carried in an arm 296. Referring to Fig. 9, said arm is mounted upon a sleeve 66 which is geared to the type carrier 293. It will be readily seen from the foregoing description that when the control lever 196 (Fig. 8) is placed in the "Eliminate" position 214 (Fig. 16) the type carrier 293 will be positioned so as to print the character "E" both on the inserted slip (Fig. 17) and the record strip (Fig. 21).

Securely fastened on the right end of the shaft 197 (Fig. 12) is an arm 235 which carries a pin 236 engaging with a slot 237 formed in an arm 238 which is pivoted on a stud 239 mounted in the printer plate 85. Attached to the upper end of arm 238 is a link 240 having a slot 241 guided by the stud 242. The opposite end of link 240 is pivoted to a stud 243 which is mounted in an arm 244 pivoted on a stud 245 adjustably carried in an elongated slot 246 of a segment lever 247, which is pivoted on the shaft 175. The lower end 248 of the arm 244 is bifurcated so as normally to engage a stud 249 carried on the link 178 and to permit disengagement of the arm 244 from said stud 249 when the control lever is moved from the "Total" position to either of the other positions, as shown by the index (Fig. 16). The arm 244 also carries a stud 250 (Fig. 12) which passes over the upper edge 251 of plate 252 when the arm disengages from the stud 249, thereby holding the segment lever 247 rigid during the operation of the crank 180. With the arm 244 engaged with stud 249 the stud 250 passes over the edge 253 of the plate 252 when the link 178 is drawn downward, thereby locking the arm 244 with the stud 249, so that the oscillating motion of the frame 165 is imparted to segment lever 247.

The segment lever 247 meshes with a gear 254 mounted fast on the shaft 137, to which is securely fastened, to the left of plate 85, a segment 255 (Figs. 8, 10 and 11) which meshes with a gear 256. Securely fastened to the gear 256 by rivets 257 is a disk 258 carrying a stud 259. Pivoted on this stud is a pawl 260 held in contact with a ratchet 261 by a spring 262 interposed between a bent-over lip on the disk 258 and the free end of the pawl 260. Gear 256 is loosely mounted on the hub of ratchet 261, said ratchet being loosely mounted on the stud 263 and held in place by a screw 264. Securely fastened to ratchet 261 by rivets 265 is a gear 266, which meshes with a pinion 267 (Fig. 8) securely fastened to a shaft 268 which rotates in a clockwise direction. Coupling shaft 268 with the "Recording" totalizer shaft 49 (Fig. 4) is a shaft 269 (Fig. 1ᴮ) jointed to and disposed at an angle to the shafts connected.

The rotation of the shaft 269 (Fig. 1ᴮ) for the purpose of returning to normal zero position the accumulator members of the recording totalizer, is timed to occur after the printing upon the slip and the strip during the operation of the total printing crank. The crank 180 (Fig. 15) by mechanism, previously described, imparts a rocking motion to the frame 165 (Fig. 12) which having a link connection with the gear train actuating the pawl 260 (Fig. 10) will cause the said pawl to back up a distance of two notches in the member 261 and then on its movement forward will rotate the gear 256 two-thirds of a revolution and in turn the gear 267 one complete revolution. Gear 267 is fast upon the shaft 268 and is connected to shaft 49 (Fig. 4) by the connecting member 269 (Fig. 1ᴮ). The accumulating elements 47 (Fig. 4) carrying a spring controlled pawl engaging with a groove in the shaft 49, which mechanism is well known in the art, will by the rotating of said shaft 49 return all elements in the recording totalizer to their normal zero position. It is, of course, essential after a total has been printed to turn the totalizing mechanism back to zero position and this function is performed by the above described mechanism and by so doing the type wheels 75 and the scroll plates 57 are rotated to the position corresponding to zero, ready for the next operation.

By considering the foregoing description of parts connecting the control lever 196 with the "Recording" totalizer it will be readily seen that when the control lever is in "Total" position, as per index plate, as shown by the drawings, and the crank 180 is operated, as previously described, the accumulators or elements of the "Recording" totalizer which have been rotated out of normal or zero position by the actuators 44 will be returned to normal position by the rotation of the grooved shaft 49 after the total has been printed, which means has previously been described.

If the control lever 196 be in the "S" total position on the index plate 198 (Fig. 16) at the time of operating the total printing crank 180 the same printing functions will be performed as when the control lever is in the total position. The recording totalizer elements will not be disturbed for the reason that the turn to zero mechanism is disconnected from the oscillating member 165 (Fig. 12) by the action of the parts connecting the control lever 196 with the link 178, which mechanism has previously been described.

With the control lever 196 in the "Eliminate" position on the index plate 198 there would be no occasion to operate the total printing crank 180; for in the index position items registered by the key 30 would not be entered in the recording totalizer therefore there would be no accumulation of amounts or items of which to print a total.

After having fully described the mechanism in detail an explanation of the operation of the machine will follow.

For the purpose of illustration we will refer to the slip shown by Fig. 18, which is of well known form used in retail stores. The clerk fills in the heading above the double horizontal lines and also writes in the center column the names of the articles purchased together with the price of each article which is written in the right hand column. The slip is then detached from the book, of which it is usually a part, and placed upon the table in the printer hood in alignment with a guide mark 316 (Fig. 26) so that the first printed record will occur to the left of the first article or item below the double lines. In placing the slip upon the table it is passed between the two knurled wheels 278 and 279 after which the knurled knob 289 above the table is turned to allow the knurled wheels to firmly grip the slip. The slip having been properly placed and the control lever being in the "Total" position, as shown by the index plate, we are now ready to proceed with the recording operation.

The register key or keys corresponding to the first amount shown in the right column of the slip is operated in a manner well known in the art. By the operation of said key or keys the amount is recorded on numeral wheels in the "Grand" totalizer and upon the "Recording" totalizer and, by means of pinions and sleeves making a connection from the actuators to the item type carriers, a printed record is made by the aid of the double inking ribbons and movable platens upon the record strip, and also upon the slip in the column to the left of the name of the article. The other amounts written upon the slip are recorded in the same manner, the slip being automatically moved toward the rear of the table one space at each operation by the rotation of the knurled wheels. Having recorded each individual amount it is desired to print the total of the same upon the slip and also upon the record strip. Proceeding with the operation the crank 180 is given two revolutions in a clockwise direction during which time the total printing type carriers are positioned by the arms 132 coming into contact with the scroll plates of the "Recording" totalizer. Following the positioning of the total printing type carriers the platen arm is raised bringing the platens into contact with both the total printing type carriers and the "Total" type plate and with the aid of the double inking ribbons print a record of the total on the record strip and on the slip under the item amount previously printed. It will be noted that the star (Fig. 18) appearing in the total printing to the left and in line with the figures is a symbol of the word "Total" on the index plate and is positioned by the control lever during this transaction. During the rotation of the crank and at the time following the printing, the "Recording" totalizer is automatically cleared or set to zero by mechanism which connects the crank with the "Recording" totalizer shaft, the rotation of which returns all elements of the "Recording" totalizer to the zero position ready for the accumulation of other transactions.

The "Grand" totalizer is not cleared or set to zero at this time but continues to accumulate other amounts for any desired period of time after which it is cleared or set to zero by turning an inserted key, which is well known in the art.

There are other transactions which require a slight variation in the operation of the machine as described above. For example, we will refer to Fig. 17 which represents a transaction in which only one article was purchased. In this case it will be seen that it is neither necessary to use the "Recording" totalizer nor operate the crank. However, it will be necessary to place the control lever in the "Eliminate" position on the index so as to prevent the amount being recorded by the key 30, into the "Recording" totalizer and so as to print the symbol "E" representing the position of the control lever. It will be understood that the amount will be recorded in the "Grand" totalizer the same as in the previous transaction.

There is still another transaction requiring a slight variation of the operation of the machine as in the case shown by Figs. 19 and 20 where the number of articles entering into the transaction require two or more slips. In this event at the bottom of the first slip a sub-total is printed by placing the control lever in the "S" total position on the index and then operating the totalizing crank in the usual manner. But as the control lever is in the "S" total position, the "Recording" totalizer will not be cleared or set to zero as in the total position for the reason that the resetting means is disconnected from the totalizing crank mechanism when said lever occupies the aforesaid position, and will continue to accumulate the amounts shown on the second slip (Fig. 20) in addition to those on the first slip (Fig. 19) and after the last individual item or amount is printed by the register key the control lever is changed from the "S" total position to the "Total" position and the crank then rotated in a manner previously explained, printing a total of all the amounts shown on both slips at the bottom of the second slip, duplicating the printing upon the record strip and clearing or setting to zero the "Recording" totalizer.

There are various other transactions as shown on the record strip (Fig. 21) which require slight changes in the operation of the machine.

The first item at the top of the strip (Fig. 21) represents a "Charge" transaction which was recorded by the operation of special key 89 together with the twenty-dollar key (Fig. 1ᴬ) and the twenty-cent key (Fig. 1ᴮ).

The second item represents a "Received on account" transaction recorded by the operation of special key 88 together with the seven-dollar key and the fifty-cent key (Fig. 1ᴬ).

The third item represents a "Paid out" transaction and was recorded by operating the special key 90 (Fig. 1ᴮ) together with the five-dollar key (Fig. 1ᴬ).

The fourth item represents a "No sale" transaction recorded by operating special key 91 (Fig. 1ᴮ).

While the form of mechanism herein shown and described is admirably adapted to fulfil the objects primarily stated it is to be understood that it is not intended to confine the invention to the one form of embodiment herein shown and described as it is susceptible of embodiment in various forms all coming within the scope of the claims which follow.

What is claimed is:

1. In a machine of the class described, the combination of a totalizer including graduated elements, item entering means for entering items in said totalizer, determining means co-operating with said graduated elements for determining the total of the items which have been entered in said totalizer, a plurality of printing mechanisms, means extending between said determining means and one of said printing mechanisms, means extending between said item entering means and another of said printing mechanisms, and impression means for taking an impression from said plurality of printing mechanisms upon record material whereby there will be recorded thereon the items entered in said totalizer and the total of the items entered in said totalizer.

2. In a machine of the class described, the combination of a totalizer including graduated elements, item entering means for entering items in said totalizer, a plurality of printing mechanisms, determining means co-operating with said graduated elements for determining the differential setting of one of said printing mechanisms, means intermediate the item entering means and another of said printing mechanisms for setting up in said printing mechanism the items as they are entered in the totalizer, means for taking an impression from the last mentioned printing mechanism of said items of a single transaction on a plurality of sheets of record material insertible singly into the machine, means for printing on one of said sheets the total of the items thereon from the first mentioned printing mechanism and for printing the total of the transaction on another of said sheets, and manipulative means for determining the nature of the total to be printed.

3. In a machine of the class described, the combination of a totalizer, including graduated elements, item entering means for entering items in said totalizer, a plurality of printing mechanisms, determining means co-operating with said graduated elements for determining the differential setting of one of said printing mechanisms, means intermediate the item entering means and another of said printing mechanisms for setting up in said printing mechanism the items as they are entered in the totalizer, means for taking an impression from the last mentioned printing mechanism of said items of a single transaction on a plurality of sheets of record material insertible singly into the machine, and means for printing on one of said sheets the total of the items thereon from the first mentioned printing mechanism and for printing the total of a transaction on another of said sheets.

4. In a machine of the class described, the combination of an item printing mechanism, a total printing mechanism spaced from the item printing mechanism, and operable independently thereof, a record strip, and means for feeding said record strip from the item printing mechanism toward the total printing mechanism different distances for item and total printing.

5. In a machine of the class described, the combination of an item printing mechanism, item entering keys operable to drive said printing mechanism, a total printing mechanism spaced from the item printing mechanism, and operated by means independent of said keys, an inking ribbon, and means for feeding said inking ribbon different distances for item and total printing.

6. In a machine of the class described, item keys for operating said mechanism, the combination of an item printing mechanism, a total printing mechanism, independent operating means therefor, a record strip and inking ribbon movable in the direction from the item printing mechanism to the total printing mechanism, means operated by said item keys for feeding said record strip and inking ribbon for item printing, and means operated by said total printing operating means for feeding the same for total printing.

7. In a machine of the class described, the combination an item printing mechanism involving a set of type elements, a total printing mechanism, involving an independent set of type elements, a record strip and inking ribbon movable in the direction from the item printing elements to the total printing elements, means for feeding said record strip and inking ribbon for item printing, and a different means for feeding the same a greater distance for total printing.

8. In a machine of the class described, the combination of separate and independently adjustable item and total printing elements, an inking ribbon common to said elements, and means for imparting advances of variable extent to said ribbon to present fresh surfaces for both item and total printing.

9. In a machine of the class described, the combination of item printing wheels, total printing wheels located in advance of said item printing wheels, an inking ribbon in operative relation with said item and total printing wheels, means to advance the ribbon to present a fresh surface to said item printing wheels, and means to advance the ribbon to present a fresh surface to said total printing wheels.

10. In a machine of the class described, the combination of item entering means, a totalizer for accumulating therein the total of said items, printing mechanisms comprising a plurality of sets of type wheels, determining means to determine the total of the amounts entered in the totalizer, said determining means comprising members movable into contact with said totalizer, devices each of which carries one of said members, actuating means for the type wheels extending from another portion of the devices to actuate said devices, an operating device for moving said actuating means and giving an oscillatory motion to said devices so that the determining means will contact with the totalizer and thereby adjust one of said sets of type wheels commensurate with the amount in said totalizer.

11. In a machine of the class described, the combination of a totalizer, item entering means for entering items therein, a printing mechanism including a plurality of parallelly arranged sets of type wheels, means for transferring to one set of type wheels an item entered in the totalizer, means for transferring a total of several items to another set of type wheels, impression means co-operating with the first set of type wheels for printing a single item, and another impression means adjacent the first impression means for printing a total of two or more items from the second set of type wheels.

12. In a machine of the class described, the combination of a plurality of printing mechanisms, a plurality of totalizers adapted to be simultaneously actuated, item entering means for entering items in said totalizers, means for transferring the total of several items from one of said totalizers to one of said printing mechanisms, means for adjusting another of said printing mechanisms to extents commensurate with the value of each of the items entered, and means for eliminating the actuation of said one totalizer upon the entry of a single item and causing an entry of the item in the other totalizer and at the same time printing said item upon the record strip.

13. In a machine of the class described, the combination of means for entering the value of succeeding items, a shaft actuated thereby, an accumulator therefor, means for printing the individual items, means for printing the total accumulated, item type wheels, total type wheels, actuating means for the printing of the items driven by said shaft, and actuating means independent thereof for printing the totals.

14. In a machine of the class described, the combination of registering mechanism, printing mechanism for showing a total of certain transactions, a totalizing crank and shaft actuated thereby, a rocking member, means for transmitting motion from said shaft to said rocking member, a second rocking member, means for transmitting motion from the first to the second rocking member, a mounting for said second rocking member, a retaining member moving with said mounting springs, a plurality of spring actuated arms normally held by said springs against said retainer, a series of intermediately actuated members having a connection with said printing mechanism, another series of actuated members moved by said intermediate members mounted on a series of transfer means extending to the vicinity of said registering means, and a series of extending arms on said transfer means capable of being moved into contact with variably positioned portions of said registering mechanism whereby those arms contacting therewith are prevented from moving the full extent of their normal movement thus likewise preventing the parts connected therewith from moving the fullest extent and thus retaining the intermediate member in a fixed position a sufficient time during which printing from the type wheels is effected.

15. In a machine of the class described, the combination of an operating member, a segmental gear, a connection there between, a totalizer, a turn to zero mechanism actuated by said segmental gear, adjustable coupling means joining said segmental gear to said connection, a lock for said coupling means, control means, connecting means between said control means and said coupling means whereby the coupling means shall be moved to uncoupled position by the control means and maintained in that position by the locking means, a printing mechanism, a connection between the same and the said control means, said printing mechanism indicating the position of said control means in uncoupled position and in coupled position of said coupling means.

16. In a machine of the class described, the combination of a totalizer, means for entering items in said totalizer, an operating device operable only independent of the item entering means, printing elements, connections independent of said item entering means intermediate the totalizer and printing elements rendered effective by an operation of the operating device to adjust said printing elements according to the amount on the totalizer, and connections intermediate the totalizer and operating device for resetting the former to zero by operation of the latter.

17. In a machine of the class described, the combination of a totalizer, means for entering items in said totalizer, an operating device operable only independent of the item entering means, printing elements, connections intermediate the totalizer and printing elements rendered effective by an operation of the operating device to adjust said printing elements according to the amount on the totalizer, connections intermediate the totalizer and operating device for resetting the former to zero by operation of the latter, and manipulative means for disabling said connections at will.

18. In a machine of the class described, the combination of a grand totalizer, a recording totalizer, key-actuated item entering means adapted to enter items on both of said totalizers simultaneously, and means operable at will prior to an operation of said item entering means for preventing the entry of items on the recording totalizer while permitting the entry of items on the grand totalizer.

19. In a machine of the class described, the combination of a plurality of totalizers, key-actuated item entering means adapted to enter items on all of said totalizers simultaneously, and means operable at will prior to an operation of said item entering means for preventing the entry of items on certain of said totalizers while permitting the entry of the items on certain of said totalizers.

20. In a machine of the class described, the combination of a plurality of totalizers, item entering means for entering items on said totalizers simultaneously, an operating device operable only independent of said item entering means, printing means for printing the items entered, said printing means being operated upon an operation of the item entering means, and additional printing means operable upon an operation of said operating device for printing the total of items appearing upon certain of said totalizers.

21. In a machine of the class described, the combination of a plurality of totalizers, item entering means for entering items on said totalizers simultaneously, an operating device operable only independent of said item entering means, printing means for printing items and totals upon record material, the printing of items being effected upon an operation of the item entering means, and connections intermediate certain of said totalizers and said printing means and controlled by any operation of the operating device for controlling the adjustment of the printing means from a totalizer whereby the total appearing on said totalizer will be printed.

22. In a machine of the class described, the combination of a plurality of totalizers, item entering means for entering items on said totalizers simultaneously, an operating device operable only independent of said item entering means, printing means for printing the items entered, said printing means being operated upon an operation of the item entering means, additional printing means operable upon an operation of said operating device for printing the total of items appearing upon certain of said totalizers, and connections intermediate said certain totalizer and the operating device whereby said totalizer will be reset to zero.

23. In a machine of the class described, the combination of a plurality of totalizers, item entering means for entering items on said totalizers simultaneously, an operating device operable only independently of said item entering means, printing means for printing items and totals upon record material, the printing of items being effected upon an operation of the item entering means, connections intermediate certain of said totalizers and said printing means and controlled by an operation of the operating device for controlling the adjustment of the printing means from a totalizer whereby the total appearing on said totalizer will be printed, and connections intermediate said certain totalizer and the operating device whereby said totalizer will be reset to zero.

24. In a machine of the class described, the combination of a plurality of totalizers, item entering means for entering items on said totalizers simultaneously, an operating device operable only independent of said item entering means, printing means for printing the items entered said printing means being operated upon an operation of the item entering means, additional printing means operable upon an operation of said operating device for printing the total of items appearing upon certain of said totalizers, connections intermediate said certain totalizer and the operating device whereby said totalizer will be reset to zero, and manipulative means for disabling said resetting connections at will.

25. In a machine of the class described, the combination of a plurality of totalizers, item entering means for entering items on said totalizers simultaneously, an operating device operable only independently of said item entering means, printing means for printing items and totals upon record material, the printing of items being effected upon an operation of the item entering means, connections intermediate certain of said totalizers and said printing means and controlled by an operation of the operating device for controlling the adjustment of the printing means from a totalizer whereby the total appearing on said totalizer will be printed, connections intermediate said certain totalizer and the operating device whereby said totalizer will be reset to zero, and manipulative means for disabling said resetting connections at will.

26. In a machine of the class described, the combination of two totalizers, item entering means for controlling the entry of items therein, means operable prior to the operation of the item entering means for preventing the entry of items on one of said totalizers, and means operable in conjunction with said item entering means for preventing the entry of items on the other of said totalizers.

27. In a machine of the class described, the combination of two totalizers, item entering means for controlling the entry of items therein, means operable to prevent the entry of items in one of said totalizers, an additional means operable to prevent the entry of items in the other of said totalizers, printing elements for printing on record material items entered, and additional printing means for printing characters or symbols in connection with the items to indicate when either one or both of said preventing means has been operated.

28. In a machine of the class described, the combination of a totalizer, item entering means for entering items therein, printing elements, an operating device, connections intermediate the totalizer and printing elements, said connections being rendered effective by an operation of the operating device to adjust the printing elements to an extent commensurate with the total of items appearing on the totalizer, means intermediate the totalizer and operating device for resetting the former upon an operation of the latter, means adjustable to a plurality of positions, connections controlled by said adjustable means for preventing the entry of items on the totalizers when said adjustable means is in one of its positions, and other connections controlled by said adjustable means for disabling the resetting connections when said adjustable means is in another of its positions.

29. In a machine of the class described, the combination of a totalizer, item entering means for entering items therein, printing elements, an operating device, connections intermediate the totalizer and printing elements, said connections being rendered effective by an operation of the operating device to adjust the printing elements to an extent commensurate with the total of items appearing on the totalizer, means intermediate the totalizer and operating device for resetting the former upon an operation of the latter, means adjustable to a plurality of positions, connections controlled by said adjustable means for preventing the entry of items on the totalizer when said adjustable means is in one of its positions, other connections controlled by said adjustable means for disabling the resetting connections when said adjustable means is in another of its positions, and an additional printing element for printing characters or symbols each appropriate to one of the positions of said adjustable element.

30. In a machine of the class described, the combination of a totalizer, item entering means for entering items thereon, item printing elements for printing on record material the items entered by the item entering means said printing elements being controlled by said item entering means, a second set of printing elements, an operating device operable only independent of the item entering means, connections intermediate the totalizer and said second set of printing elements and controlled by said operating device for adjusting said second set of printing elements extents commensurate with the total of items appearing on the totalizer, impression means for taking an impression from the first set of printing elements and operated upon an operation of the item entering means and a second impression device for taking an impression on record material from the second set of printing elements and operated by said operating device.

31. In a machine of the class described, the combination of a totalizer, differentially movable actuators therefor, total recording elements, and means for adjusting said recording elements dissimultaneously with any movement of said actuators.

32. In a machine of the class described, the combination of a totalizer, actuators therefor engageable with and disengageable from said totalizer, total recording elements, and means for adjusting said recording elements independently of any operation involving a movement of said actuators.

33. In a machine of the class described, total recording elements, a totalizer and item entering means therefor, and means cooperable with said totalizer independently of every part of said item entering means for adjusting said total recording elements in accordance with the amount in the totalizer.

34. In a machine of the class described, a totalizer, item recording elements, means for actuating the totalizer and simultaneously adjusting the item recording elements, total recording elements, and means operable independently of any movement of the totalizer and of said actuating means for adjusting said total recording elements in accordance with the accumulation in the totalizer.

35. In a machine of the class described, the combination of item recording elements, a totalizer total recording elements, means for adjusting said item recording elements independently of said total recording elements, and means for adjusting said total recording elements in accordance with an item or summation of items independently of any movement of said adjusting means for said item recording elements and said totalizer.

36. In a machine of the class described, the combination of item recording elements, total recording elements, relatively immovable parallel spaced bearings for said item and total recording elements, and separate and independently operable means for adjusting said item and total recording elements in accordance with the items and totals of items involved.

37. In a machine of the class described, the combination of item recording wheels and total recording wheels mounted in spaced non-co-axial immovable bearings, means for adjusting the item recording wheels, and means independent of said adjusting means for adjusting said total recording wheels.

38. In a machine of the class described, the combination of item entering means, an accumulator actuated thereby, item recording elements adjustable to record items entered in said accumulator, total recording mechanism involving recording elements normally disconnected from said accumulator, and means for operating the total recording mechanism and adjusting the recording elements to record the amounts in the accumulator independently of an operation of said item entering means and accumulator.

39. In a machine of the class described, the combination of a set of item recording elements, a set of total recording elements, separate movable impression means for co-operation with said sets of recording elements and separate and independent operating means for said impression means for taking impressions from said item and total recording elements.

40. In a machine of the class described, the combination of item recording elements, operating means for adjusting said elements, total recording elements, operating means for adjusting said total recording elements, and means under the control of one of said operating means for preventing an operation of the other operating means.

41. In a machine of the class described, the combination of item recording means, independent total recording means for recording totals and sub-totals, adjustable manipulative means for pre-determining the nature of the total to be recorded, and means for locking both of said recording means during adjustment of said manipulative means.

42. In a machine of the class described, the combination of item recording elements, total recording elements for recording totals and sub-totals, adjustable manipulative means for pre-determining the nature of the total to be recorded, and means for locking said item recording element and manipulative means upon operation of said total recording means.

43. In a machine of the class described, the combination of item and total recording means, and a single adjustable manipulative means for excluding an item from total recording and for pre-determining the nature of a total recording of items not excluded.

44. In a machine of the class described, the combination of item type carriers, total type carriers, independent impression means for each of said carriers, and independent mechanisms for moving said carriers into adjusted position and for operating said impression means.

45. In a machine of the class described, the combination of a plurality of totalizers, item entering means therefor, means to exclude certain kinds of transactions from one of said totalizers, means adapted to record every item for which the item entering means is manipulated, and a member adjustable to positions to exclude certain items from the other totalizer and to record total and sub-totals of other items from said other totalizer.

46. In a calculating machine, the combination of a toothed device for accumulating a series of numbers into sub-totals, a toothed device for totalizing a plurality of such sub-totals into grand-totals, toothed actuators of corresponding denominational orders immovable relatively to each other, said actuators being correlated with said devices for actuating them, and a printing mechanism for printing the accumulated sub-totals independently of any operation of said actuators.

47. In a calculating machine, the combination of a sub-total accumulator operable to accumulate totals of items; a grand-total accumulator operable to accumulate a grand-total of a plurality of sub-totals accumulated on the sub-total accumulator; printing mechanism operable to print the items, printing mechanism to print sub-totals and totals, common operating means for operating said accumulators and item printing mechanism, and an independent operating means for operating said total printing mechanism.

48. In a registering machine, a set of sub-totalizer elements adapted to be restored to zero, a set of grand totalizer elements, means for simultaneously entering items on each of said sets, graduated elements movable by said sub-totalizer elements, contact means movable into engagement with said graduated elements, type means adjustable under control of said contact means and said graduated elements, to positions corresponding to the amount standing on the sub-totalizer elements, means for taking an impression from said type means, means for restoring said sub-totalizer elements to zero position, and a common operating mechanism independent of said item entering means adapted to impel said contact means against said graduated elements, adjust said type means, take a total impression from said type means and restore said sub-totalizer elements to zero.

49. In a registering machine, a set of sub-totalizer elements adapted to be restored to zero, a set of grand totalizer elements adapted to be turned to zero, means for simultaneously entering items on each of said sets, graduated elements movable under the control of said sub-totalizer elements, pivoted feeler fingers movable into engagement with said graduated elements, type means adjustable under control of said feeler fingers and said graduated elements to positions corresponding to the amount standing on the sub-totalizer elements, means for taking an impression from said type means, means for restoring said sub-totalizer elements to zero position, and a common operating mechanism operable independently of said item entering means adapted to impel said feeler fingers against said graduated elements, adjust said type means, take a total impression from said type means and restore said sub-totalizer elements only to zero.

50. In a registering machine, a set of sub-totalizer wheels adapted to be restored to zero, a set of grand totalizer wheels adapted to be restored to zero, means for simultaneously entering items on each of said sets, spirally graduated plates movable under control of said sub-totalizer wheels, pivoted feeler fingers movable into engagement with said plates, type means adjustable under control of said feeler fingers and said plates to positions corresponding to the amount standing on the sub-totalizer wheels, means for taking an impression from said type means, means for turning said sub-totalizer wheels to zero position, and a common operating mechanism operable independently of said item entering means adapted to impel said feeler fingers against said plates, adjust said type means, take a total impression from said type means and turn said sub-totalizer wheels to zero, without turning said grand totalizer wheels to zero.

51. In a registering machine, a set of sub-totalizer wheels, a shaft supporting said wheels, means for entering items on said wheels, graduated elements movable under the control of said sub-totalizer wheels, contact means movable into engagement with said graduated elements, type means adjustable under control of said contact means and said graduated elements to positions corresponding to the amount standing on the sub-totalizer wheels, means for taking an impression from said type means, means for turning said sub-totalizer to zero position comprising said shaft and connections between said shaft and said wheels, and a common operating mechanism operable independently of said item entering means adapted to impel said contact means against said graduated means, adjust said type means take a total impression from said type means and rotate said shaft to turn said sub-totalizer wheels to zero.

52. In a registering machine, a set of sub-totalizer wheels, a shaft supporting said wheels, means for entering items on said wheels, graduated elements movable by said sub-totalizer wheels, pivoted feeler fingers movable into engagement with said graduated elements, type means adjustable under control of said feeler fingers and said graduated elements to positions corresponding to the amount standing on the sub-totalizer wheels, means for taking an impression from said type means, means for turning said sub-totalizer wheels to zero position comprising said shaft and connections between said shaft and said wheels, and a common operating mechanism operable independent of said item entering means adapted to impel said feeler fingers against said graduated elements, adjust said type means, take a total impression from said type means and rotate said shaft to turn said sub-totalizer wheels to zero.

53. In a registering machine, the combination of a set of sub-totalizer elements adapted to be restored to zero, a set of grand totalizer elements adapted to be restored to zero, means for simultaneously entering items on both of said sets of elements, a set of item type carriers controlled by said item entering means, a set of graduated controlling elements moving in unison with the sub-toalizer elements, a set of arms movable into and out of engagement with the graduated controlling elements, means comprising springs for effecting said movements, type carriers adjustable to represent sub-totals, devices controlled by the movable arms for adjusting the type carriers to print sub-totals, independent means for taking impressions from item and sub-total type carriers, and means for clearing the sub-totalizer elements without disturbing the grand totalizer elements.

54. In a registering machine, the combination of a set of grand totalizer elements, a set of sub-totalizer elements, means for simultaneously entering items on both of said sets of elements, a set of graduated controlling elements movable under the control of said sub-totalizer elements, a set of arms movable into engagement with the graduated elements, a device having a fixed extent of movement in total taking operations, springs for transmitting motion from said device to the movable arms until said arms are arrested by the graduated controlling elements, adjustable type carriers, means controlled by the movable arms for adjusting the type carriers to represent the sub-total on the sub-totalizer elements, means for taking impressions from said type carriers, and means operable independently of said item entering means for effecting a total taking operation.

55. In a registering machine, the combination of a set of grand totalizer elements adapted to be restored to zero, a set of sub-totalizer elements adapted to be restored to zero, means for simultaneously entering items on both of said sets of elements, a set of graduated controlling elements moving in unison with the sub-totalizer elements, a set of arms movable into engagement with the graduated elements, a device having a fixed extent of movement in total taking operations, springs for transmitting motion from said device to the movable arms until said arms are arrested by the graduated controlling elements, adjustable type carriers, means controlled by the movable arms for adjusting the type carriers independently of said item entering means to represent the sub-total on the sub-totalizer elements, means for taking impressions from said type carriers, and means for clearing the sub-totalizer without disturbing the grand totalizer elements.

56. In a machine of the class described, the combination of a totalizer, means for entering items thereon, printing means for printing on record material the items entered on the totalizer, said printing means being actuated upon the operation of the item entering means, an operating device operable only independently of the item entering means, additional printing means for printing upon said record material the total of items appearing on the totalizer, connections intermediate the totalizer and said additional printing means and operated upon an operation of the operating device for adjusting said printing means according to the total appearing on said totalizer, means for taking an impression from said additional printing means whereby the total of the items on the totalizer will be printed upon record material, feeding means for feeding said record material certain distances during item printing operations, and means for giving said feeding means a greater feed upon an operation of the operating device.

57. In a machine of the class described, the combination of a totalizer, means for entering items therein, printing mechanism including total printing devices and separate item printing devices said item printing devices being actuated by the item entering means, an operating device, connections controlled by said operating device for effecting an adjustment of said total printing devices to print totals appearing on the totalizer, impression means cooperating with said total printing devices operated by said operating device, feeding mechanism operable upon an operation of said item entering means for feeding said record material a certain distance during item printing operations, and means operated by said operating device for giving said feeding mechanism a special feeding movement during a total printing operation.

58. In a machine of the class described, the combination of printing mechanism comprising printing elements for printing items and printing elements for printing totals, independent controlling connections for adjusting both sets of printing elements, independent impression means for each of said sets of elements, means for feeding record material, an operating device for operating the item impression means and for operating the record material feeding means to feed said record material between successive item impressions, a total impression operating means, and connections intermediate said feeding means and said total impression operating means for feeding the record material a greater distance upon total printing operations.

59. In a machine of the class described, the combination of printing mechanism including a set of printing elements for printing items and an additional set of printing elements for printing totals, independent impression means one for each of said sets of printing elements for taking impressions therefrom upon record material, a total impression operating means, means for feeding record material from a supply roll, said feeding means being effective upon an operation of the printing elements and impression means for printing items to feed the record strip certain distances to space successive items, and connections intermediate said feeding means and operating means whereby said feeding means is operated to feed the record material a greater distance when an impression is taken from the total printing elements.

60. In a machine of the class described, the combination of a totalizer, totalizer actuators for entering items therein, total printing elements, and means independent of said actuators normally disconnected from said totalizer for adjusting said elements according to the amounts in the totalizer.

In testimony whereof I affix my signature.

EDWARD J. VON PEIN.

Certificate of Correction.

It is hereby certified that in Letters Patent No. 1,555,534, granted September 29, 1925, upon the application of Edward J. Von Pein, of Dayton, Ohio, for an improvement in " Cash Registers," errors appear in the printed specification requiring correction as follows: Page 1, line 16, after the word " provide " insert the clause *an accounting machine mechanism for recording;* line 29, for the word " ports " read *parts;* page 11, line 24, claim 6, strike out the words " item keys for operating said mechanism " and insert the same to follow after the word " mechanism," line 25; same page and claim, line 27, after the word " therefor " insert a comma; and that the said Leters Patent should be read with these corrections therein that the same may conform to the record of the case in the Patent Office.

Signed and sealed this 8th day of December, A. D. 1925.

[SEAL.]

WM. A. KINNAN,
*Acting Commissioner of Patents.*